(12) United States Patent
Wong et al.

(10) Patent No.: US 12,134,440 B2
(45) Date of Patent: Nov. 5, 2024

(54) OPERATING DEVICE FOR HUMAN-POWERED VEHICLE

(71) Applicant: Shimano Inc., Osaka (JP)

(72) Inventors: Yen Hee Jessie Wong, Johor (MY); Fei Ping Boo, Johor (MY); Sui Cheng Ng, Johor (MY)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/080,997

(22) Filed: Dec. 14, 2022

(65) Prior Publication Data

US 2024/0199165 A1 Jun. 20, 2024

(51) Int. Cl.
*B62L 3/02* (2006.01)
*B62K 23/06* (2006.01)
*B62M 25/04* (2006.01)

(52) U.S. Cl.
CPC .............. *B62L 3/023* (2013.01); *B62K 23/06* (2013.01); *B62M 25/04* (2013.01)

(58) Field of Classification Search
CPC ......... B62K 23/06; B62M 25/04; B62L 3/023
See application file for complete search history.

(56) References Cited

U.S. PATENT DOCUMENTS

| | | | | |
|---|---|---|---|---|
| 7,650,813 B2* | 1/2010 | Tsumiyama | ........... | B62M 25/08 192/217 |
| 8,061,667 B2* | 11/2011 | Weiss | ...................... | B60T 7/102 248/230.4 |
| 8,201,476 B2* | 6/2012 | Tsumiyama | ........... | G05G 11/00 74/502.2 |
| 8,375,825 B2* | 2/2013 | Hirose | ................... | B62M 25/04 74/489 |
| 9,073,595 B2* | 7/2015 | Miki | ....................... | B62K 23/06 |
| 9,511,815 B2* | 12/2016 | Hirotomi | ............... | B62K 23/06 |
| 9,550,544 B2 | 1/2017 | Takeuchi et al. | | |
| 9,731,787 B2* | 8/2017 | Hirotomi | ............... | B62K 23/06 |
| 10,358,183 B2 | 7/2019 | Komada et al. | | |
| 10,543,884 B2 | 1/2020 | Nakamura et al. | | |
| 2005/0092125 A1 | 5/2005 | Tetsuka | | |

(Continued)

FOREIGN PATENT DOCUMENTS

| CN | 208376990 U | 1/2019 |
|---|---|---|
| JP | 2005-132354 A | 5/2005 |

OTHER PUBLICATIONS

Shimano Inc.; Dealer's Manual General Operations for DM-GN0001-26; pp. 1-182; Feb. 2022 Japan.

(Continued)

*Primary Examiner* — Daniel D Yabut
(74) *Attorney, Agent, or Firm* — Global IP Counselors, LLP

(57) ABSTRACT

An operating device is provided to a human-powered vehicle. The operating device is basically provided with a first base member, a first operating member, a second base member and a first shift operating member. The first base member includes a cylinder housing. The first operating member is movably coupled to the first base member. The second base member is coupled to the first base member by a first coupling member. The first shift operating member is movably coupled to the second base member on a first pivot axle. The first coupling member couples the second base member to the cylinder housing.

26 Claims, 17 Drawing Sheets

(56) References Cited

U.S. PATENT DOCUMENTS

| | | |
|---|---|---|
| 2018/0043962 A1 | 2/2018 | Ng et al. |
| 2018/0086413 A1* | 3/2018 | Komatsu ................ B62M 25/08 |
| 2018/0274562 A1* | 9/2018 | Chambers .............. B62M 25/08 |
| 2019/0100273 A1* | 4/2019 | Miyazaki ................ B62K 23/06 |
| 2021/0371044 A1* | 12/2021 | Kosaka .................. B62J 45/413 |

OTHER PUBLICATIONS

Shimano Inc.; Dealer's Manual Shifting Lever for DM-MBSL001-01; pp. 1-25; Dec. 2016 Japan.
Shimano Inc.; XTR Rapidfire Lever SL-M980, SM-SL98; pp. 1-4; Apr. 2010 Japan.

* cited by examiner

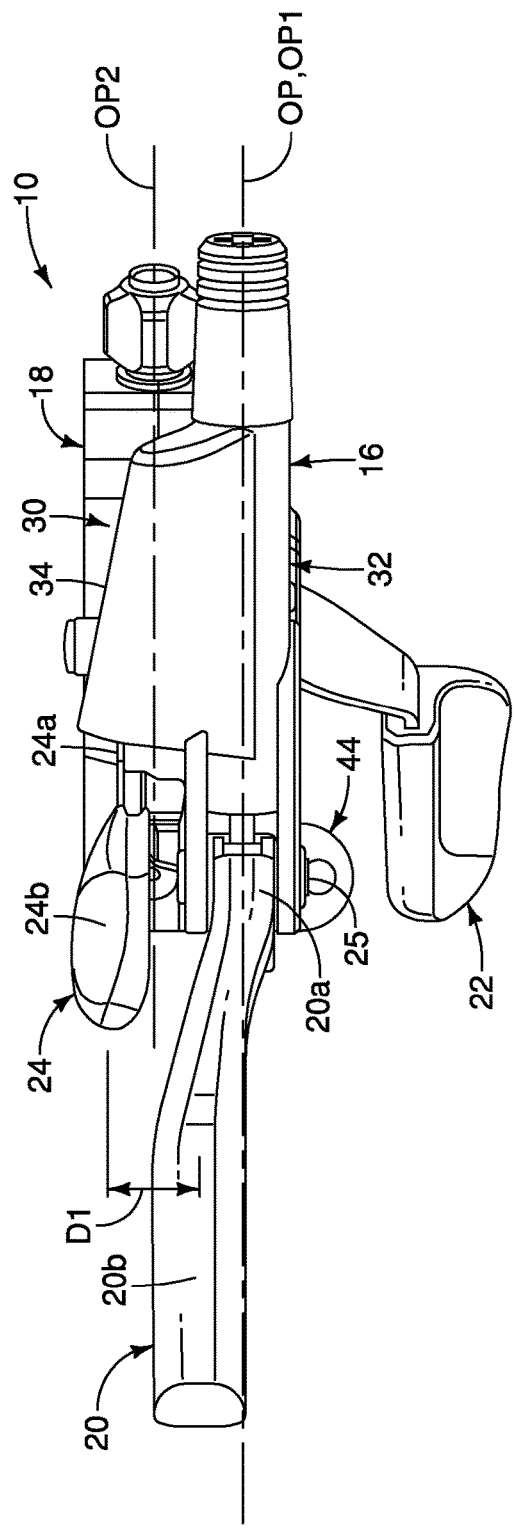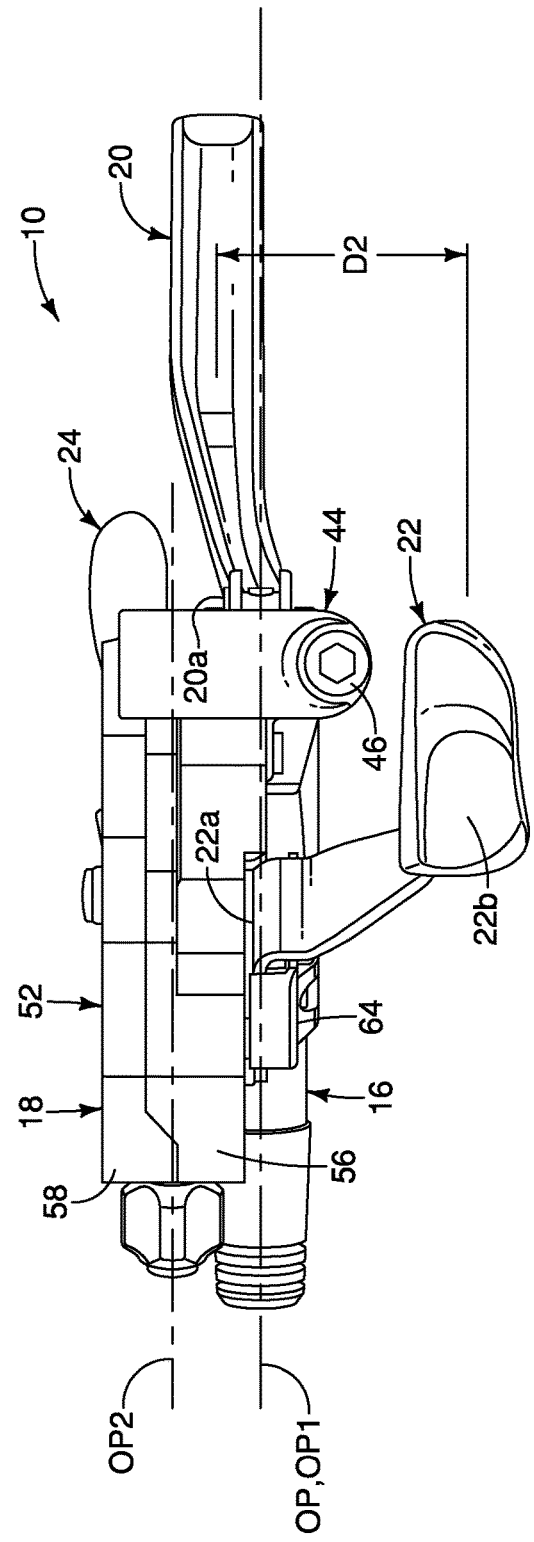

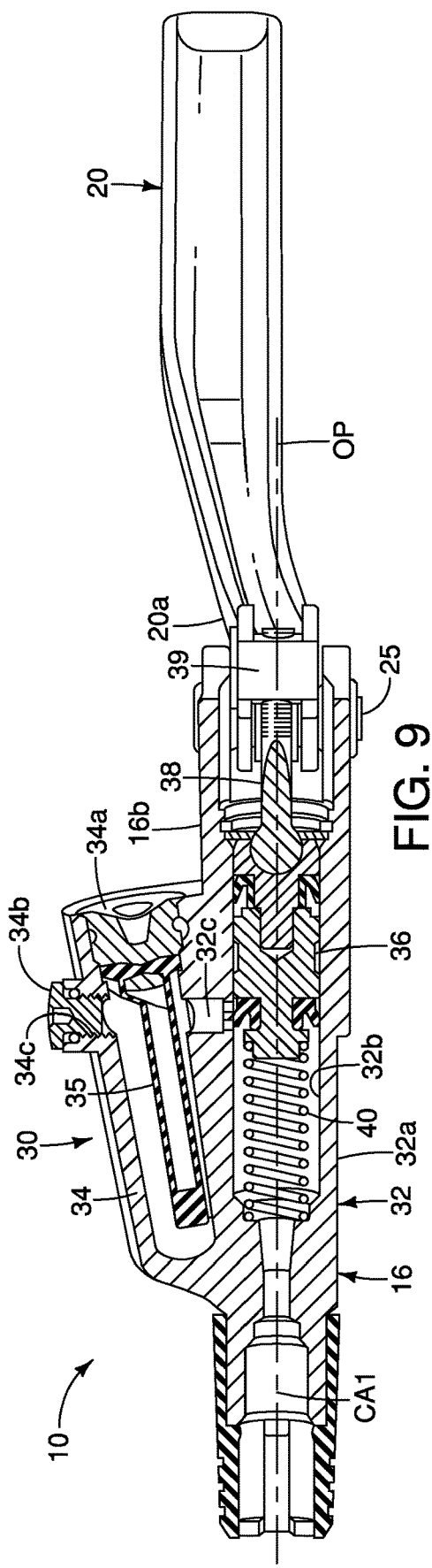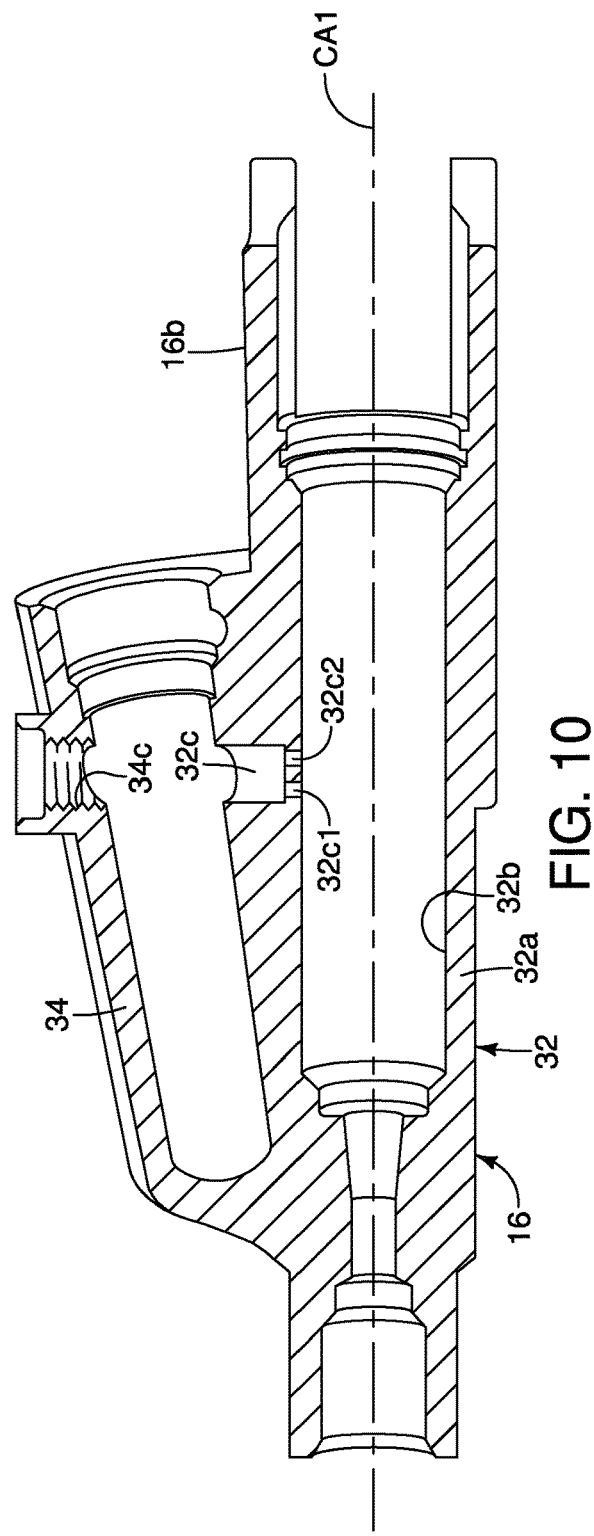

OPERATING DEVICE FOR HUMAN-POWERED VEHICLE

BACKGROUND

Technical Field

This disclosure generally relates to an operating device for a human-powered vehicle.

Background Information

Generally, a human-powered vehicle has one or more components that are operated by a rider using one or more operating devices for operating one or more the components. There are many types of operating devices. For example, the operating device can be mechanically, hydraulically and/or electrically connected to the component(s). Typically, a human-powered vehicle has a handlebar with one operating device provided at each side of the handlebar so that the rider's right hand can operate one of the operating devices and the rider's left hand can operate the other operating device. Some operating devices combine both shifting and braking functions into a single unit. For example, U.S. Pat. Nos. 8,695,454 and 9,321,506 both disclose an operating device that combines both shifting and braking functions into a single unit. In these U.S. patents, a mechanical shift mechanism is provided for performing the shifting function and a hydraulic unit is provided for performing the braking function.

SUMMARY

Generally, the present disclosure is directed to various features of an operating device for a human-powered vehicle. The term "human-powered vehicle" as used herein refers to a vehicle that can be propelled by at least human driving force to produce propulsion, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, an operating device is provided to a human-powered vehicle. The operating device basically comprises a first base member, a first operating member, a second base member and a first shift operating member. The first base member includes a cylinder housing. The first operating member is movably coupled to the first base member. The second base member is coupled to the first base member by a first coupling member. The first shift operating member is movably coupled to the second base member on a first pivot axle. The first coupling member couples the second base member to the cylinder housing.

With the operating device according to the first aspect, the assembly process of the operating device can be accomplished more efficiently such that the operating device can be relatively economical to manufactured.

In accordance with a second aspect of the present disclosure, the operating device according to the first aspect is configured so that the cylinder housing includes a cylinder wall defining a cylinder bore, and a first extending portion extending outwardly from the cylinder wall. Also, the first coupling member couples the second base member to the first extending portion.

With the operating device according to the second aspect, the second base member can be easily and reliably attached to the first extending portion of the cylinder wall by the first coupling member.

In accordance with a third aspect of the present disclosure, the operating device according to the second aspect further comprises a piston operatively coupled to the first operating member and movably disposed in a cylinder bore of the cylinder housing.

With the operating device according to the third aspect, a remotely located component can be hydraulically actuated in response to the first operating member being operated.

In accordance with a fourth aspect of the present disclosure, the operating device according to the second aspect or the third aspect is configured so that the first base member includes a reservoir fluidly connected to the cylinder bore by a connecting opening.

With the operating device according to the fourth aspect, it is possible to absorb a volume change of a fluid in the cylinder bore.

In accordance with a fifth aspect of the present disclosure, the operating device according to the fourth aspect is configured so that the first operating member is movable relative to the first base member along an operating plane. The first shift operating member is disposed on one side of the operating plane. The reservoir is disposed on an opposite side of the operating plane from the first shift operating member.

With the operating device according to the fifth aspect, the first shift operating member can be operated without interference with the reservoir.

In accordance with a sixth aspect of the present disclosure, an operating device is provided to a human-powered vehicle. The operating device basically comprises a first base member, a first operating member, a second base member and a first shift operating member. The first base member includes a cylinder housing and a reservoir fluidly connected to a cylinder bore of the cylinder housing. The first operating member is movably coupled to the first base member. The second base member is coupled to the first base member. The first shift operating member is movably coupled to the second base member on a first pivot axle. The first operating member is movable relative to the first base member along an operating plane. The first shift operating member is disposed on one side of the operating plane. The reservoir is disposed on an opposite side of the operating plane from the first shift operating member.

With the operating device according to the sixth aspect, the assembly process of the operating device can be accomplished more efficiently such that the operating device can be relatively economical to manufactured. Also, the first shift operating member can be operated without interference with the reservoir.

In accordance with a seventh aspect of the present disclosure, the operating device according to any one of the fourth aspect to the sixth aspect further comprises a second shift operating member movably coupled to the second base member on a second pivot axle. The second shift operating member is movable relative to the first base member along a second operating plane. The reservoir is at least partly disposed on the second operating plane.

With the operating device according to the seventh aspect, the second shift operating member can be conveniently located for easy operation.

In accordance with an eighth aspect of the present disclosure, the operating device according to any one of the first aspect to the sixth aspect further comprises a second shift operating member movably coupled to the second base member on a second pivot axle. The first base member further includes an integrated portion integrally formed with the cylinder housing. The second base member is coupled to the integrated portion by a second coupling member. The second coupling member is offset from the second pivot axle as viewed from an axial direction of the second pivot axle.

With the operating device according to the eighth aspect, the second base member can be easily and reliably attached to the integrated portion of the first base member by the second coupling member.

In accordance with a ninth aspect of the present disclosure, the operating device according to the eighth aspect is configured so that the first pivot axle and the second pivot axle are parallel. The first coupling member and the second coupling member are offset from the first pivot axle and the second pivot axle as viewed in a direction parallel to the first pivot axle and the second pivot axle.

With the operating device according to the ninth aspect, the second base member can be easily and reliably attached to the first base member using the first coupling member and the second coupling member.

In accordance with a tenth aspect of the present disclosure, the operating device according to the eighth aspect or the ninth aspect is configured so that the first pivot axle and the second pivot axle are free from direct connection to the first base member.

With the operating device according to the tenth aspect, the first pivot axle and the second pivot axle can be assembly to the second base member before the second base member is attached to the first base member.

In accordance with an eleventh aspect of the present disclosure, the operating device according to any one of the eighth aspect to the tenth aspect is configured so that the first operating member is movable relative to the first base member along an operating plane. The first shift operating member is disposed on one side of the operating plane. The second shift operating member is disposed on an opposite side of the operating plane from the first shift operating member.

With the operating device according to the eleventh aspect, the first operating member, the first shift operating member and the second shift operating member can be easily operated without interference with the other operating members.

In accordance with a twelfth aspect of the present disclosure, the operating device according to any one of the second aspect to the seventh aspect is configured so that the first base member further includes an integrated portion integrally formed with the cylinder housing. The second base member is coupled to the integrated portion by a second coupling member. The first extending portion extends from the cylinder wall in a first direction into an area between the cylinder wall and the intermediate portion. The second extending portion extends from the intermediate portion in a second direction into the area. The second direction is different from the first direction.

With the operating device according to the twelfth aspect, the first extending portion and the second extending portion stably support the second base member to the first base member.

In accordance with a thirteenth aspect of the present disclosure, the operating device according to any one of the first aspect to the seventh aspect is configured so that the first base member further includes an integrated portion integrally formed with the cylinder housing, and the second base member is coupled to the integrated portion by a second coupling member.

With the operating device according to the thirteenth aspect, the second base member can be easily coupled to the first base member in a relatively simple manner.

In accordance with a fourteenth aspect of the present disclosure, an operating device is provided to a human-powered vehicle. The operating device basically comprises a first base member, a first operating member, a second base member and a first shift operating member. The first base member includes a cylinder housing and an integrated portion integrally formed with the cylinder housing. The first operating member is movably coupled to the first base member. The second base member is coupled to the first base member by a first coupling member and a second coupling member. The first shift operating member is movably coupled to the second base member on a first pivot axle. The first coupling member couples the second base member to one of the cylinder housing and the integrated portion at a first coupling point. The second coupling member couples the second base member to one of the cylinder housing and the integrated portion at a second coupling point. The second coupling point is different from the first coupling point.

With the operating device according to the fourteenth aspect, the first extending portion and the second extending portion stably support the second base member to the first base member. Also, the first extending portion and the second extending portion stably support the second base member to the first base member using the first coupling member and the second coupling member.

In accordance with a fifteenth aspect of the present disclosure, the operating device according to the fourteenth aspect is configured so that the first coupling member couples the second base member to the cylinder housing.

With the operating device according to the fifteenth aspect, the second base member is stably coupled to the cylinder housing by the first coupling member.

In accordance with a sixteenth aspect of the present disclosure, the operating device according to the fourteenth aspect or the fifteenth aspect is configured so that the second coupling member couples the second base member to the integrated portion.

With the operating device according to the sixteenth aspect, the second base member is stably coupled to the integrated portion by the second coupling member.

In accordance with a seventeenth aspect of the present disclosure, the operating device according to any one of the thirteenth aspect to the sixteenth aspect is configured so that the first base member includes a second extending portion extending outwardly from the integrated portion. The second coupling member couples the second base member to the second extending portion.

With the operating device according to the seventeenth aspect, the first extending portion and the second extending portion stably support the second base member to the first base member.

In accordance with an eighteenth aspect of the present disclosure, the operating device according to any one of the thirteenth aspect to the seventeenth aspect is configured so that the integrated portion includes an intermediate portion connecting the cylinder housing to a mounting bracket. The mounting bracket is configured to be mounted to a handlebar of the human-powered vehicle. The second coupling member couples the second base member to the intermediate portion.

With the operating device according to the eighteenth aspect, it is possible to easily mount the operating device to a handlebar and adjust the orientation of the operating lever with respect to the handlebar.

In accordance with a nineteenth aspect of the present disclosure, the operating device according to any one of the thirteenth aspect to the eighteenth aspect is configured so that the second coupling member includes one of a second rivet and a second bolt.

With the operating device according to the nineteenth aspect, it is possible to easily mount the second base member to the first base member using a second rivet and a second bolt.

In accordance with a twentieth aspect of the present disclosure, the operating device according to any one of the first aspect to the nineteenth aspect is configured so that the first coupling member includes one of a first rivet and a first bolt.

With the operating device according to the twentieth aspect, it is possible to easily mount the second base member to the first base member using a first rivet and a first bolt.

In accordance with a twenty-first aspect of the present disclosure, the operating device according to any one of the first aspect to the twentieth aspect is configured so that the first coupling member is offset from the first pivot axle as viewed from an axial direction of the first pivot axle.

With the operating device according to the twenty-first aspect, the first coupling member can be easily coupled between the first base member and the second base member during the assembly process of the operating device.

In accordance with a twenty-second aspect of the present disclosure, the operating device according to any one of the first aspect to the twenty-first aspect is configured so that the second base member includes a shift housing and a support member. The support member is at least partly disposed inside the shift housing. The shift housing is spaced apart from the first coupling member. The shift housing is a separate member from the first base member.

With the operating device according to the twenty-second aspect, the second base member can be provided with a shifting mechanism that is completely separate from the first base member.

In accordance with a twenty-third aspect of the present disclosure, an operating device is provided to a human-powered vehicle. The operating device basically comprises a first base member, a first operating member, a second base member and a first shift operating member. The first operating member is movably coupled to the first base member. The second base member includes a shift housing and a support member. The first shift operating member is movably coupled to the second base member on a first pivot axle. The support member is coupled to the first base member by a first coupling member. The support member is at least partly disposed inside the shift housing. The shift housing is apart from the first coupling member. The support member is a separate member from the first base member.

With the operating device according to the twenty-third aspect, the assembly process of the operating device can be accomplished more efficiently such that the operating device can be relatively economical to manufactured. in that a shifting mechanism can be completely assembled prior to attachment of the second base member to the first base member.

In accordance with a twenty-fourth aspect of the present disclosure, the operating device according to any one of the first aspect to the twenty-first aspect is configured so that the second base member includes a shift housing and a support member. The support member is a separate member from the first base member. The support member is disposed between a handlebar mounting axis of a mounting bracket and a cylinder axis of the cylinder housing as viewed along a direction parallel to the first pivot axle.

With the operating device according to the twenty-fourth aspect, the second base member can be provided with a shifting mechanism that is completely separate from the first base member.

In accordance with a twenty-fifth aspect of the present disclosure, an operating device is provided to a human-powered vehicle. The operating device basically comprises a first base member, a first operating member, a second base member and a first shift operating member. The first base member includes a cylinder housing. The first operating member is movably coupled to the first base member. The second base member includes a shift housing and a support member. The first shift operating member is movably coupled to the second base member on a first pivot axle. The support member is a separate member from the first base member. The support member is disposed between a handlebar mounting axis of a mounting bracket and a cylinder axis of the cylinder housing as viewed along a direction parallel to the first pivot axle.

With the operating device according to the twenty-fifth aspect, the first operating member and the first shift operating member can be easily operated by a user gripping a handlebar.

In accordance with a twenty-sixth aspect of the present disclosure, the operating device according to any one of the twenty-second aspect to the twenty-fifth aspect is configured so that the first base member includes a support portion, and the support member has a first side surface contacting the support portion.

With the operating device according to the twenty-sixth aspect, tilting of the second base member can with respect to the first base member can be reliably prevented.

In accordance with a twenty-seventh aspect of the present disclosure, the operating device according to any one of the first aspect to the twenty-sixth aspect is configured so that the first pivot axle is disposed between a handlebar mounting axis of a mounting bracket and a cylinder axis of the cylinder housing as viewed along a direction parallel to the first pivot axle.

With the operating device according to the twenty-seventh aspect, the operating device can be relatively compact.

In accordance with a twenty-eighth aspect of the present disclosure, the operating device according to any one of the first aspect to the twenty-seventh aspect further comprises a wire takeup member pivotally mounted on the second base member.

With the operating device according to the twenty-eighth aspect, the operating device can be used to remotely operate a component using a cable.

Also, other objects, features, aspects and advantages of the disclosed operating device will become apparent to those skilled in the art from the following detailed description, which, taken in conjunction with the annexed drawings, discloses preferred embodiments of the operating device.

BRIEF DESCRIPTION OF THE DRAWINGS

Referring now to the attached drawings which form a part of this original disclosure.

FIG. 4 is a first (front) side elevational view of the operating device and the portion of the handlebar illustrated in FIGS. 1 to 3.

FIG. 5 is a second (rear) side elevational view of the operating device and the portion of the handlebar illustrated in FIGS. 1 to 4.

FIG. 9 is a cross sectional view of the operating device as seen along section line 9-9 of FIG. 2.

FIG. 10 is an enlarged cross sectional view of the first base member of the operating device illustrated in FIG. 9.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
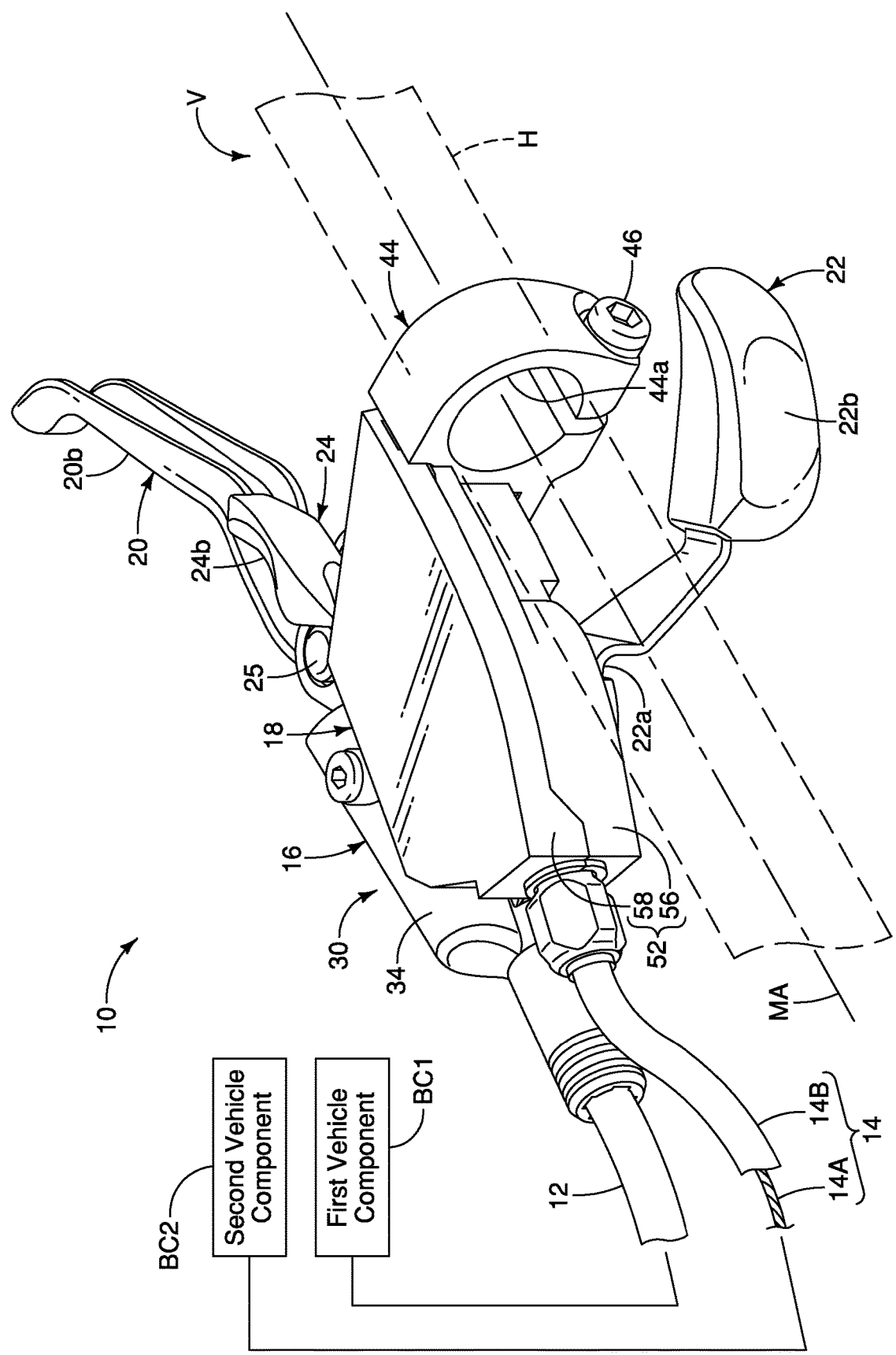
FIG. 1 is a top perspective view of a portion of a handlebar of human-powered vehicle that has an operating device in accordance with a first embodiment.

Referring initially to FIG. 1, a human-powered vehicle V is partially illustrated in which an operating device 10 is provided to the human-powered vehicle V in accordance with a first embodiment. In the first embodiment, the human-powered vehicle V is a bicycle and the operating device 10 is a bicycle operating device. As seen in FIG. 1, the operating device 10 is mounted to a portion of a vehicle handlebar H in an installed state. In the case of the human-powered vehicle V, as diagrammatically shown in FIG. 1, the operating device 10 is operatively coupled to a first vehicle component BC1 (e.g., a hydraulic brake device such as a disc brake caliper) via a hydraulic hose 12 and operatively coupled to a second vehicle component BC2 (e.g., a transmission device such as a cable operated derailleur or an internally geared hub) via a conventional control cable 14 (e.g., a Bowden cable). Thus, in the first embodiment, the operating device 10 is configured to include both a shifting function and a braking function. Alternatively, the operating device 10 can be configured to operate vehicle components other than a brake device and a transmission device. The hydraulic hose 12 and the control cable 14 are conventional structures commonly used in the human-powered vehicle field. The control cable 14 has an inner wire 14A that is slidably disposed inside an outer casing 14B.

The operating device 10 is a right hand side control device that is operated by the rider's right hand to selectively operate the first vehicle component BC1 and the second vehicle component BC2. However, it will be apparent to those skilled in the human-powered vehicle field that the configuration of the operating device 10 can be adapted to a left hand side control device that is operated by the rider's left hand. A left hand side operating device is essentially identical to the operating device 10, except that the left hand side operating device is a mirror image of the operating device 10, and the left hand side operating device may be configured to have a different number of shift operations as compared to the operating device 10. Thus, for the sake of brevity, only the operating device 10 (i.e., a right hand side control device) will be discussed and illustrated herein.

Figure 2:
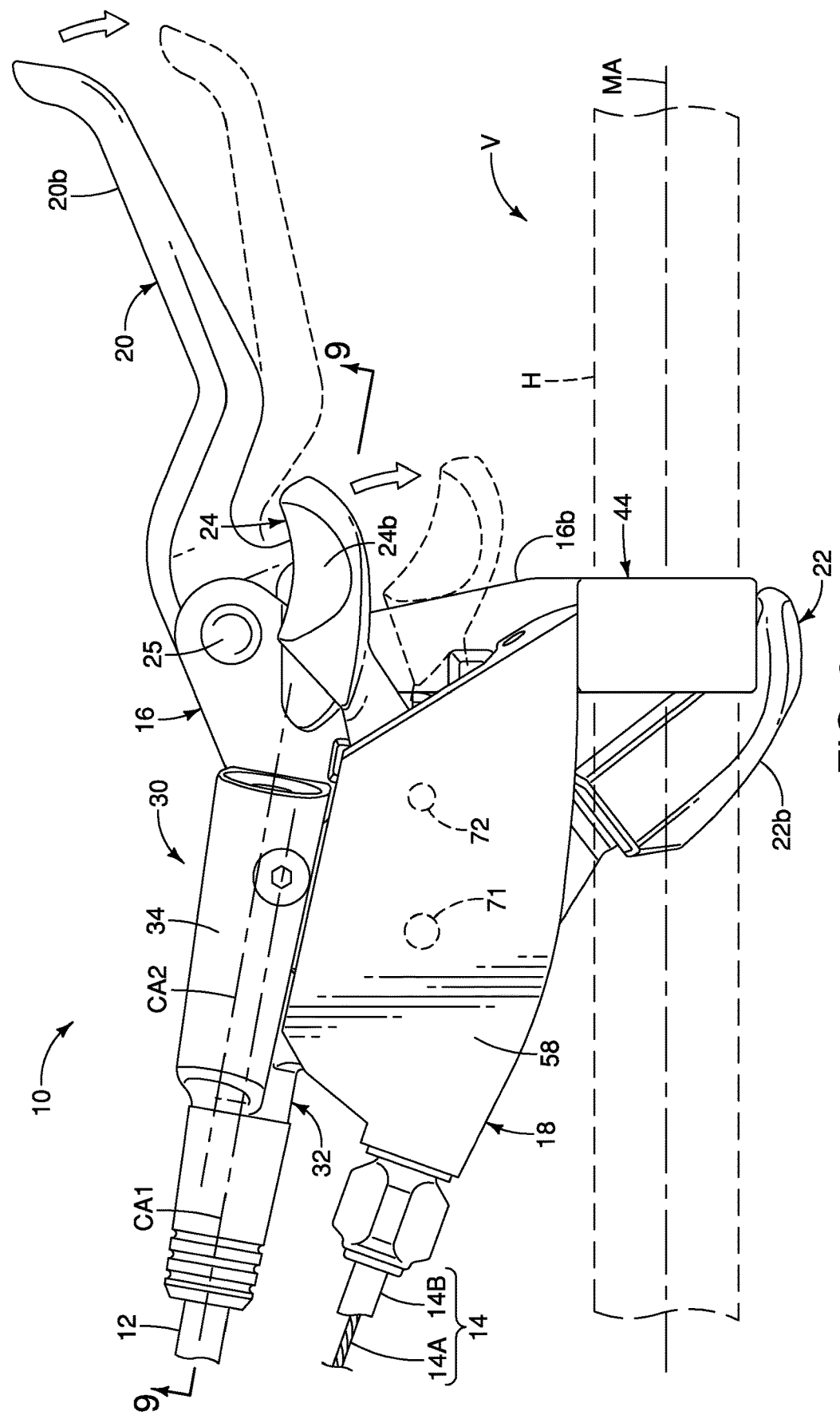
FIG. 2 is a top view of the operating device and the portion of the handlebar illustrated in FIG. 1.

Referring now to FIGS. 2 to 5, the configuration of the operating device 10 will be discussed in further detail. Basically, the operating device 10 comprises a first base member 16, a second base member 18, a first operating member 20 and a first shift operating member 22. Here, in the first embodiment, the operating device 10 further comprises a second shift operating member 24. Alternatively, the operating device 10 can be configured to use only a single shift operating member. Thus, for example, the operating device 10 can be configured so that the second shift operating member 24 can be omitted. Basically, as seen in FIG. 2, the first operating member 20 is movably coupled to the first base member 16. In particular, the first operating member 20 is pivotally coupled to the first base member 16 by a pivot pin 25. Here, operation of the first operating member 20 operates the first vehicle component BC1, which is a hydraulic brake device such as a disc brake caliper in the illustrated embodiment. On the other hand, as seen in FIG. 2, the first shift operating member 22 is movably coupled to the second base member 18. The second shift operating member 24 is also movably coupled to the second base member 18 as seen in FIG. 2. As seen in FIGS. 4 and 5, the first operating member 20 is movable relative to the first base member 16 along an operating plane OP. The first shift operating member 22 is primarily disposed on one side of the operating plane OP. On the other hand, the second shift operating member 24 is disposed on an opposite side of the operating plane OP from the first shift operating member 22. The first shift operating member 22 is movable relative to the first base member 16 along a first operating plane OP1. The second shift operating member 24 is movable relative to the first base member 16 along a second operating plane OP2.

Figure 3:
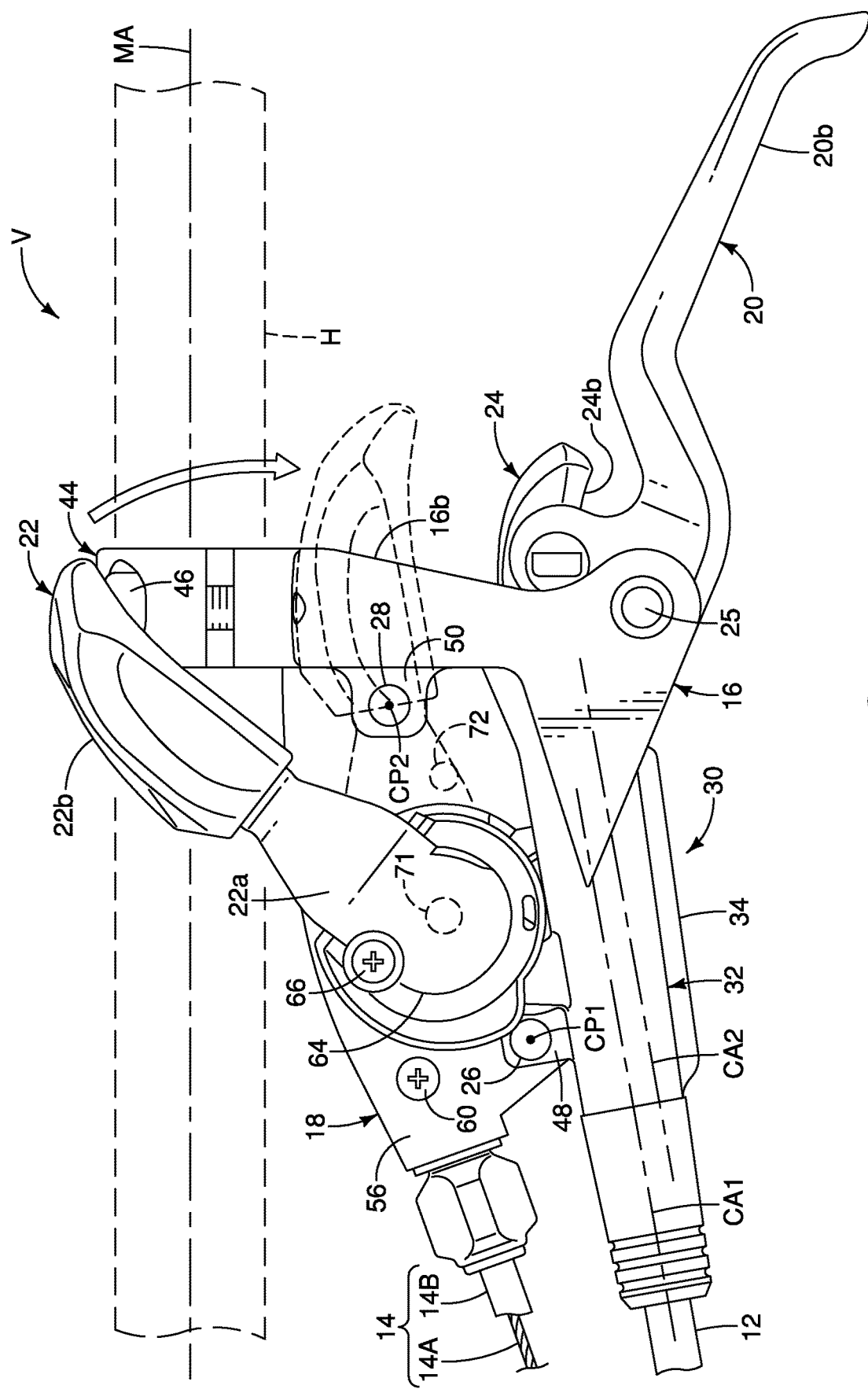
FIG. 3 is a bottom view of the operating device and the portion of the bicycle handlebar illustrated in FIG. 2 is a bottom view of the operating device and the portion of the handlebar illustrated in FIG. 1.
Figure 6:
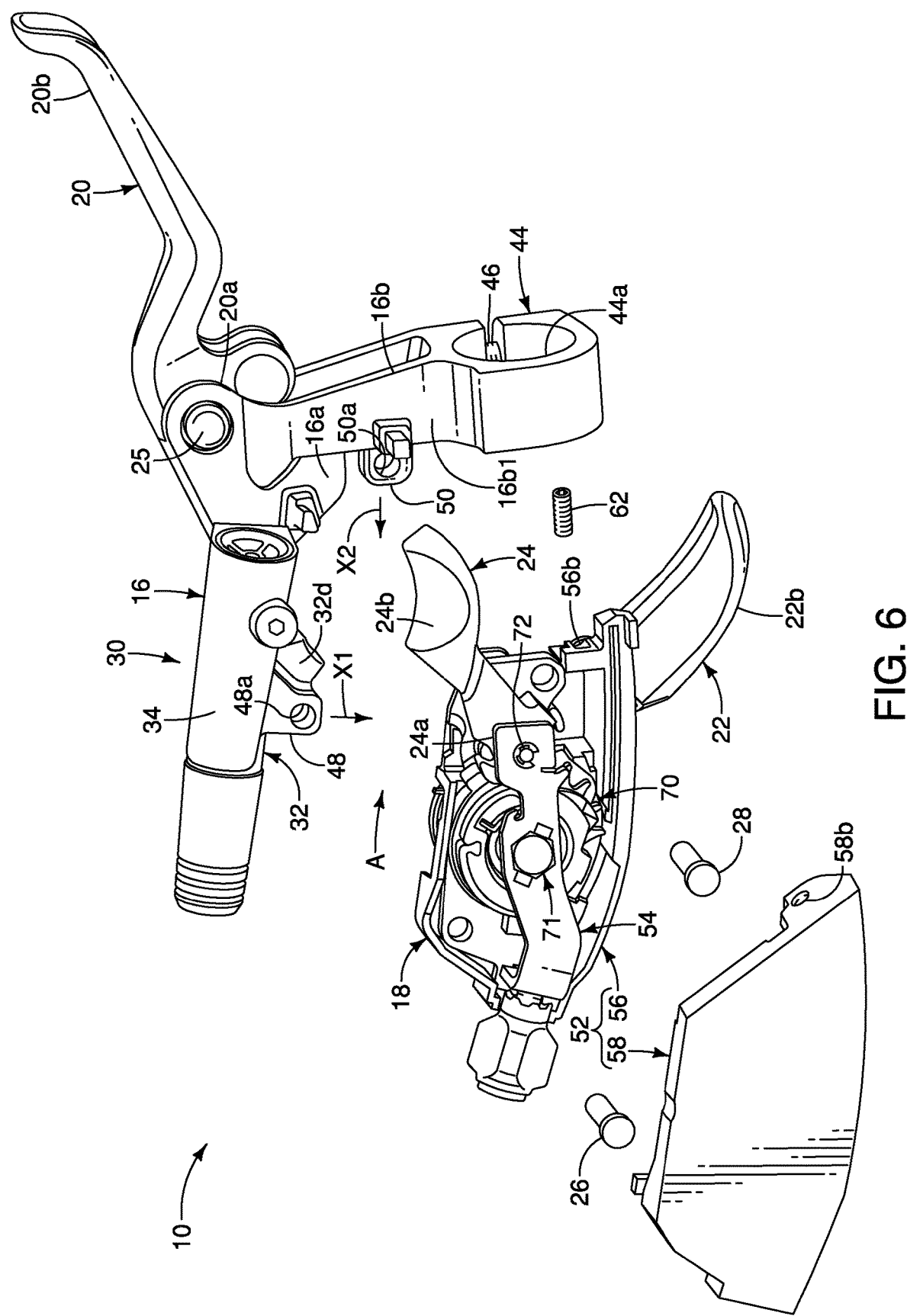
FIG. 6 is a partial exploded perspective view of the operating device and the portion of the handlebar illustrated in FIGS. 1 to 5.

As best seen in FIGS. 3 and 6, the second base member 18 is coupled to the first base member 16 by a first coupling member 26. For example, the first coupling member 26 includes one of a first rivet and a first bolt. Here, in the first embodiment, the first coupling member 26 is shown as a first rivet. In the first embodiment, the second base member 18 is further coupled to the first base member 16 by a second coupling member 28. For example, the second coupling member 28 includes one of a second rivet and a second bolt. Here, in the first embodiment, the second coupling member 28 is shown as a second rivet. In the case where rivets are used for the first coupling member 26 and the second coupling member 28, the first base member 16 is permanently fixed (i.e., without damaging parts of the operating device 10) to the second base member 18. In any case, the first coupling member 26 and the second coupling member 28 are the only coupling points between the first base member 16 and the second base member 18. If bolts are used for the first coupling member 26 and the second coupling member 28, then the second base member 18 can be detached from the first base member 16 by detaching the first coupling member 26 and the second coupling member 28 from one or the other of the first base member 16 and the second base member 18.

In the first embodiment, as seen in FIGS. 9 and 10, the first base member 16 is provided with a hydraulic unit 30. Here, the first base member 16 includes a cylinder housing 32. The first base member 16 is coupled to the cylinder housing 32 by the first coupling member 26. The cylinder housing 32 includes a cylinder wall 32a. The cylinder wall 32a defines a cylinder bore 32b. The hydraulic hose 12 is fluidly connected to the cylinder bore 32b. The hydraulic hose 12 and the cylinder bore 32b are filled with a hydraulic fluid such as a mineral oil. The cylinder bore 32b defines a cylinder axis CA1 of the cylinder housing 32. As seen in FIGS. 2 and 3, the handlebar mounting axis MA is not parallel to the cylinder axis CA1. In particular, the cylinder axis CA1 diverges away from the handlebar mounting axis MA as the cylinder axis CA1 extends in a direction away from where the first base member 16 is mounted to the handlebar H as discussed below. Here, the cylinder axis CA1 is completely contained in the operating plane OP of the first operating member 20 as seen in FIG. 9.

The first base member 16 further includes a reservoir 34. The reservoir 34 has a center axis CA2 of the reservoir tank. Here, the center axis CA2 is offset from the cylinder axis CA1 as viewed in a direction parallel to a pivot axis of the pivot pin 25. The center axis CA2 is offset from the cylinder axis CA1 to an opposite side of the second base member 18 with respect to the cylinder axis CA1. For example, in the illustrated embodiment, the center axis CA2 is offset from the cylinder axis CA1 by 3.5 millimeters. Also, here, the cylinder axis CA1 is parallel to the center axis CA2 as viewed in a direction parallel to a pivot axis of the pivot pin 25. In this way, the operating device 10 can be compact and have a high rigidity. The reservoir 34 is filled with a hydraulic fluid such as a mineral oil. The reservoir 34 is fluidly connected the cylinder housing 32. More specifically, the reservoir 34 is fluidly connected to the cylinder bore 32b of the cylinder housing 32. Here, the reservoir 34 fluidly connected to the cylinder bore 32b by a connecting opening 32c. Preferably, the connecting opening 32c includes a first port 32c1 and a second port 32c2 as seen in FIG. 10. In this way, the hydraulic fluid of the reservoir 34 is provided to the cylinder bore 32b of the cylinder housing 32 via the port 32c1 and the second port 32c2. Here, a diaphragm 35 is provided inside the reservoir 34. The diaphragm 35 is a flexible, resilient member made of a suitable material such as a rubber material. The diaphragm 35 is a unitary, one-piece member. The reservoir 34 is provided with a plug 34a for closing off an open end of the reservoir 34. The reservoir 34 is provided with a bleed screw 34b for removing air from the reservoir 34. The bleed screw 34b is screwed into a threaded bore 34c of the reservoir 34. Here, as seen in FIG. 10, the connecting opening 32c and the threaded bore 34c are axially aligned so as to be combined into one hole in the first base member 16. In this way, the connecting opening 32c and the threaded bore 34c can be easily formed.

In the first embodiment, the reservoir 34 is integrally formed with the cylinder housing 32. In particular, the reservoir 34 arranged on top of the cylinder housing 32 in a state where the operating device 10 is mounted to the human-powered vehicle V. In the first embodiment, the reservoir 34 is disposed on an opposite side of the operating plane OP from the first shift operating member 22. Also, the reservoir 34 is at least partly disposed on the second operating plane OP2. The hydraulic hose 12 is connected to the cylinder housing 32 for conveying hydraulic fluid from the hydraulic unit 30 to the first vehicle component BC1 in response to the first operating member 20 being operated.

The operating device 10 further comprises a piston 36. The piston 36 is operatively coupled to the first operating member 20 and movably disposed in the cylinder bore 32b of the cylinder housing 32. In other words, the piston 36 is moved in the cylinder bore 32b of the cylinder housing 32 in response to the operation of the first operating member 20. Thus, the hydraulic unit 30 mainly includes the cylinder housing 32, the reservoir 34 and the piston 36.

The piston 36 moves linearly inside the cylinder bore 32b in response to a braking operation of the first operating member 20. Thus, the first operating member 20 is operatively coupled to the piston 36 to move the piston 36 within the cylinder bore 32b. In particular, the operating device 10 further comprises a connecting member 38 operatively coupled between the piston 36 and the first operating member 20. The connecting member 38 has one end pivotally coupled to the first operating member 20, and the other pivotally coupled to the piston 36. In this way, the first operating member 20 is connected to the piston 36 by the connecting member 38.

The hydraulic unit 30 further comprises a piston biasing element 40. The biasing element 40 is disposed between one end of the cylinder bore 32b and the piston 36. Specifically, the piston biasing element 40 is disposed in the cylinder bore 32b, and biases the piston 36 to a non-actuated (rest or non-operated) position. Here, the piston biasing element 40 is a coil compression spring that biases the piston 36 to the non-actuated or rest position. The piston biasing element 40 also biases the first operating member 20 to its rest position (i.e., no external force applied to the first operating member 20). Thus, the piston 36 compresses the piston biasing element 40 as the piston 36 moves in the cylinder bore 40 in response to an operation of the first operating member 20. The hydraulic reservoir 34 is disposed above the cylinder bore 32b where the operating device 10 is in the mounted state. Since hydraulic units are well known, the hydraulic unit 30 will not be discussed in further detail for the sake of brevity.

Figure 13:
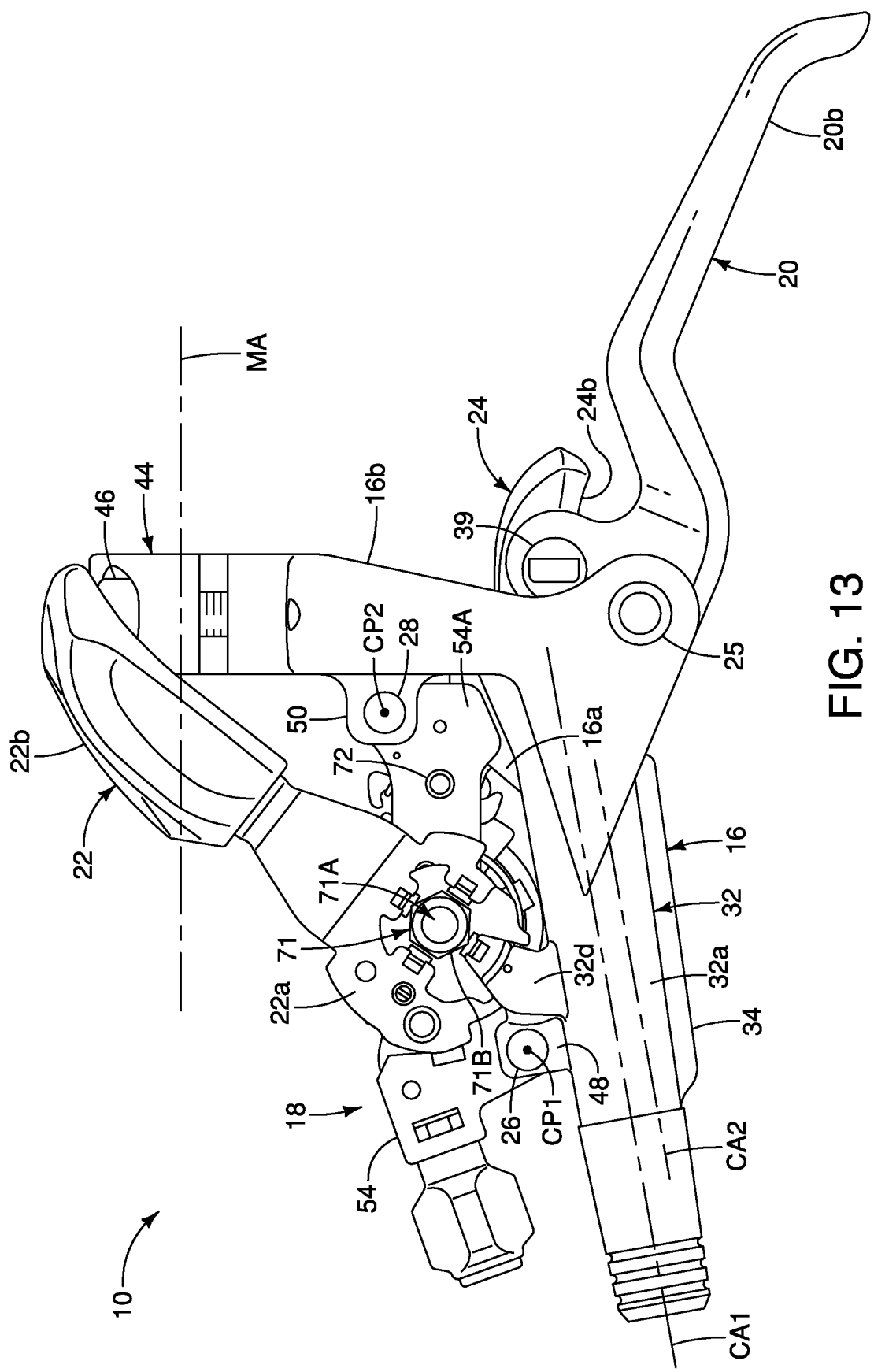
FIG. 13 is a bottom view of the operating device illustrated in FIG. 12 in which the shift housing has been omitted.
Figure 14:
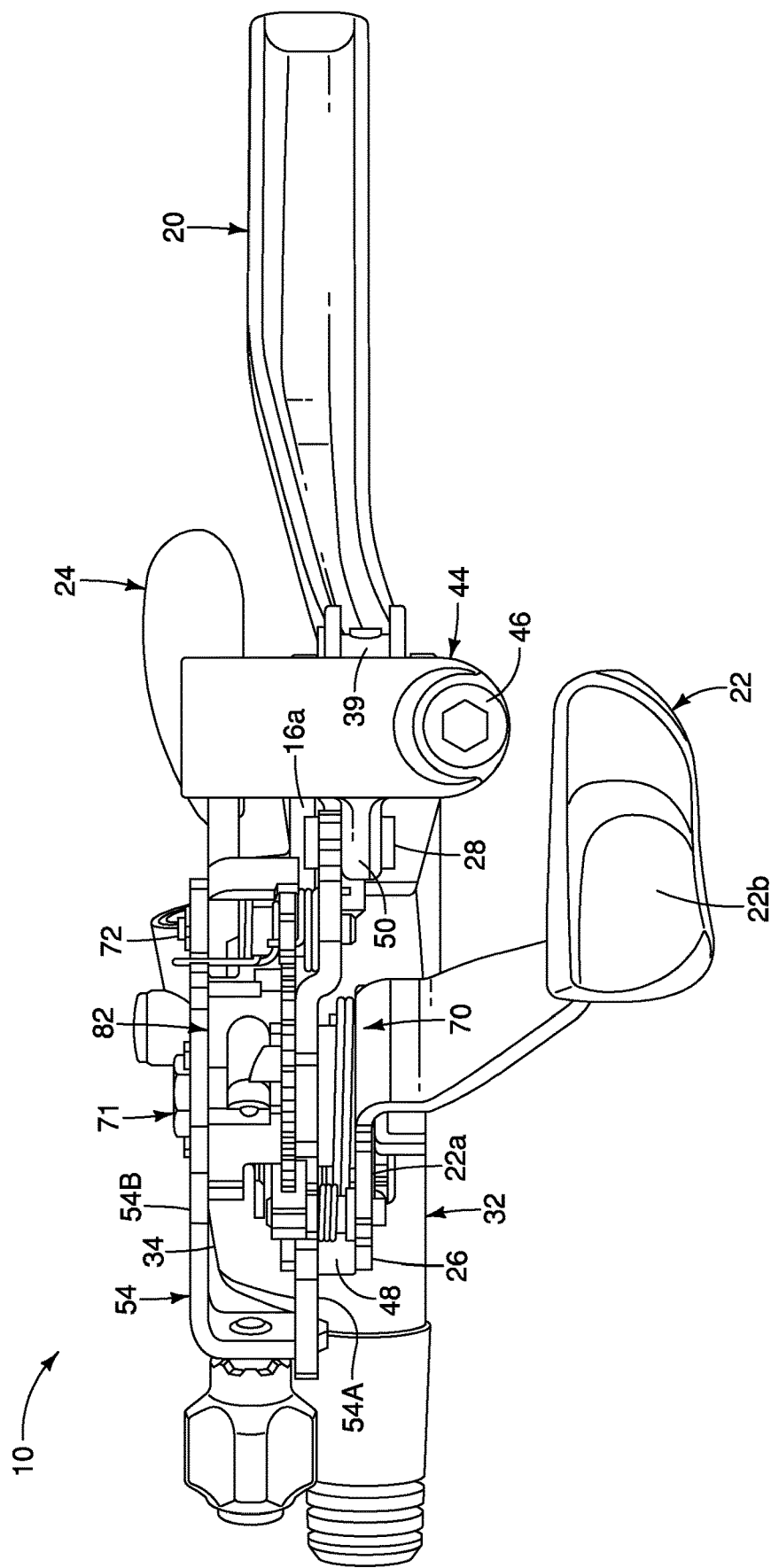
FIG. 14 is a rear side elevational view of the operating device illustrated in FIGS. 12 and 13 in which the shift housing has been omitted.

In the first embodiment, as seen in FIGS. 6, 13 and 14, the first base member 16 includes a support portion 16a. The support portion 16a is integrally formed with the cylinder housing 32. In particular, the support portion 16a extends outwardly from the cylinder wall 32a. The support portion 16a is configured to support the second base member 18 to prevent the second base member 18 from tilting relative to the second base member 18. Moreover, the first base member 16 further includes an integrated portion 16b integrally formed with the cylinder housing 32. Thus, the support portion 16a is also integrally formed with the integrated portion 16b. The second base member 18 is coupled to the integrated portion 16b by the second coupling member 28. In other words, the second coupling member 28 couples the second base member 18 to the integrated portion 16b.

As seen in FIGS. 1 to 3 and 6, the operating device 10 further comprises a mounting bracket 44. The mounting bracket 44 is coupled to the integrated portion 16b. Here, the integrated portion 16b and the mounting bracket 44 are integrally formed. Thus, the integrated portion 16b includes the mounting bracket 44 in the first embodiment. The mounting bracket 44 is configured to be mounted to the handlebar H of the human-powered vehicle V. The integrated portion 16b further includes an intermediate portion 16b1 connecting the cylinder housing 32 to the mounting bracket 44. The intermediate portion 16b1 extend between the cylinder housing 32 and the mounting bracket 44 such that the cylinder housing 32 is spaced from the handlebar H in a state where the mounting bracket 44 is mounted to the handlebar H. The intermediate portion 16b1 is configured to movably support the first operating member 20. In this way, for example, the first operating member 20 is movably coupled to the first base member 16. Here, the intermediate portion 16b1 includes an attachment recess 44a and a pair of mounting openings 44b. The first operating member 20 is partly disposed in the attachment recess 44a and pivotally coupled to the intermediate portion 16b1 by the pivot pin 25 that is disposed in the mounting openings 44. In this way, the first operating member 20 is pivotally mounted to the first base member 16 about the pivot pin 25.

The mounting bracket 44 defines a handlebar receiving opening 44a. The handlebar receiving opening 44a defines a handlebar mounting axis MA. Thus, the mounting bracket 44 is configured to be mounted to the handlebar H of the human-powered vehicle V. The mounting bracket 44 constitutes an example of a handlebar mounting member. Here, as seen in FIGS. 1 and 3, a tightening bolt 46 is provided to the mounting bracket 44 to form a tube clamp that is configured to squeeze the mounting bracket 44 onto the handlebar H. The mounting bracket 44 is made of a suitable rigid, hard material such as a hard plastic material (e.g., resin), a fiber reinforced plastic material (e.g., resin), a metallic material, etc. Here, the integrated portion 16b (the mounting bracket 44 and the intermediate portion 16b1) is integrally formed with the cylinder housing 32 as a one-piece member.

Referring to FIGS. 3 and 6, the first coupling member 26 couples the second base member 18 to one of the cylinder housing 32 and the integrated portion 16b at a first coupling point CP1, and the second coupling member 28 couples the second base member 18 to one of the cylinder housing 32 and the integrated portion 16b at a second coupling point CP2. The second coupling point CP2 is different from the first coupling point CP1. In the first embodiment, the cylinder housing 32 includes a first extending portion 48. The first extending portion 48 extends outwardly from the cylinder wall 32a. The first extending portion 48 defines the first coupling point CP1. Here, the first base member 16 further includes a second extending portion 50. The second extending portion 50 extends outwardly from the integrated portion 16b. More specifically, the second extending portion 50 extends outwardly from the intermediate portion 16b1 of the integrated portion 16b. The second extending portion 50 defines the second coupling point CP2. Thus, here, the second coupling member 28 couples the second base member 18 to the intermediate portion 16b1.

As seen in FIG. 6, the first extending portion 48 extends from the cylinder wall 32a in a first direction X1 into an area A between the cylinder wall 32a and the intermediate portion 16b1. The second extending portion 50 extends from the intermediate portion 16b1 in a second direction X2 into the area A. The second direction X2 is different from the first direction X1. The first coupling member 26 couples the second base member 18 to the first extending portion 48. As seen in FIG. 6, the first extending portion 48 includes a mounting opening 48a for receiving the first coupling member 26 therethrough. In this way, the first coupling member 26 couples the second base member 18 to the cylinder housing 32. As seen in FIG. 6, the second extending portion 50 includes a mounting opening 50a for receiving the second coupling member therethrough. In this way, the second coupling member 28 couples the second base member 18 to the second extending portion 50.

Figure 8:
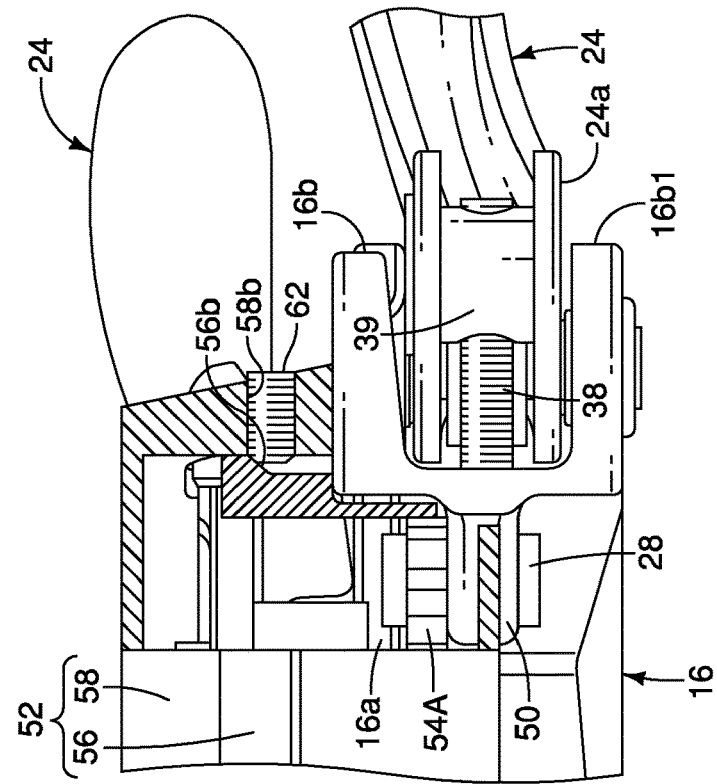
FIG. 8 is a partial side elevational view of the operating device with a portion broken away to show a second connection between of the first housing part and the second housing part of the shift housing.
Figure 7:
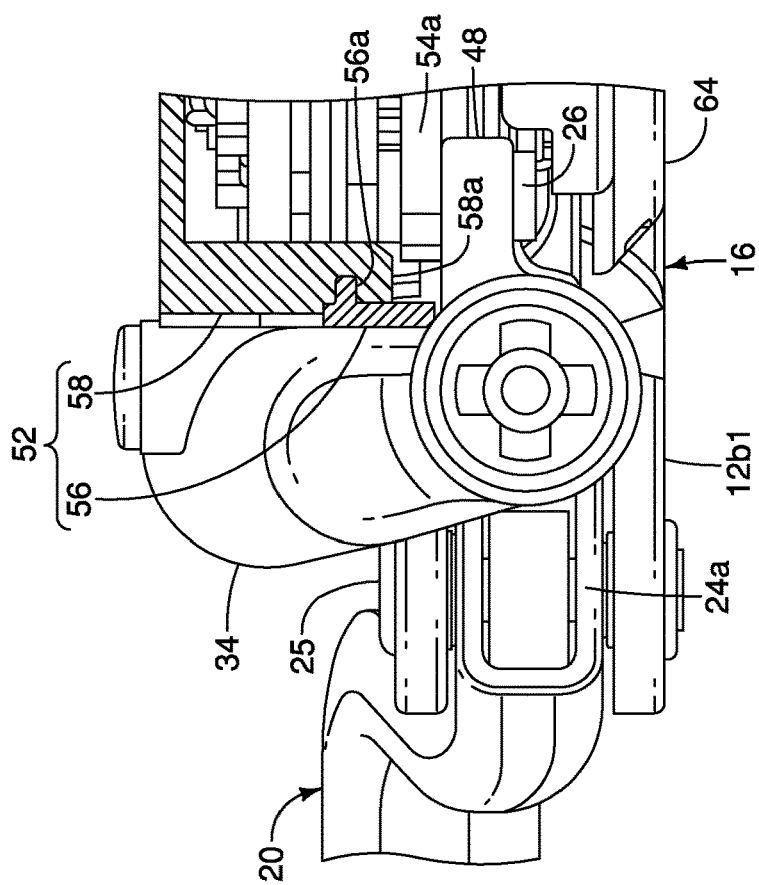
FIG. 7 is a partial side elevational view of the operating device with a portion broken away to show a first connection between a first housing part and a second housing part of the shift housing.
Figure 11:
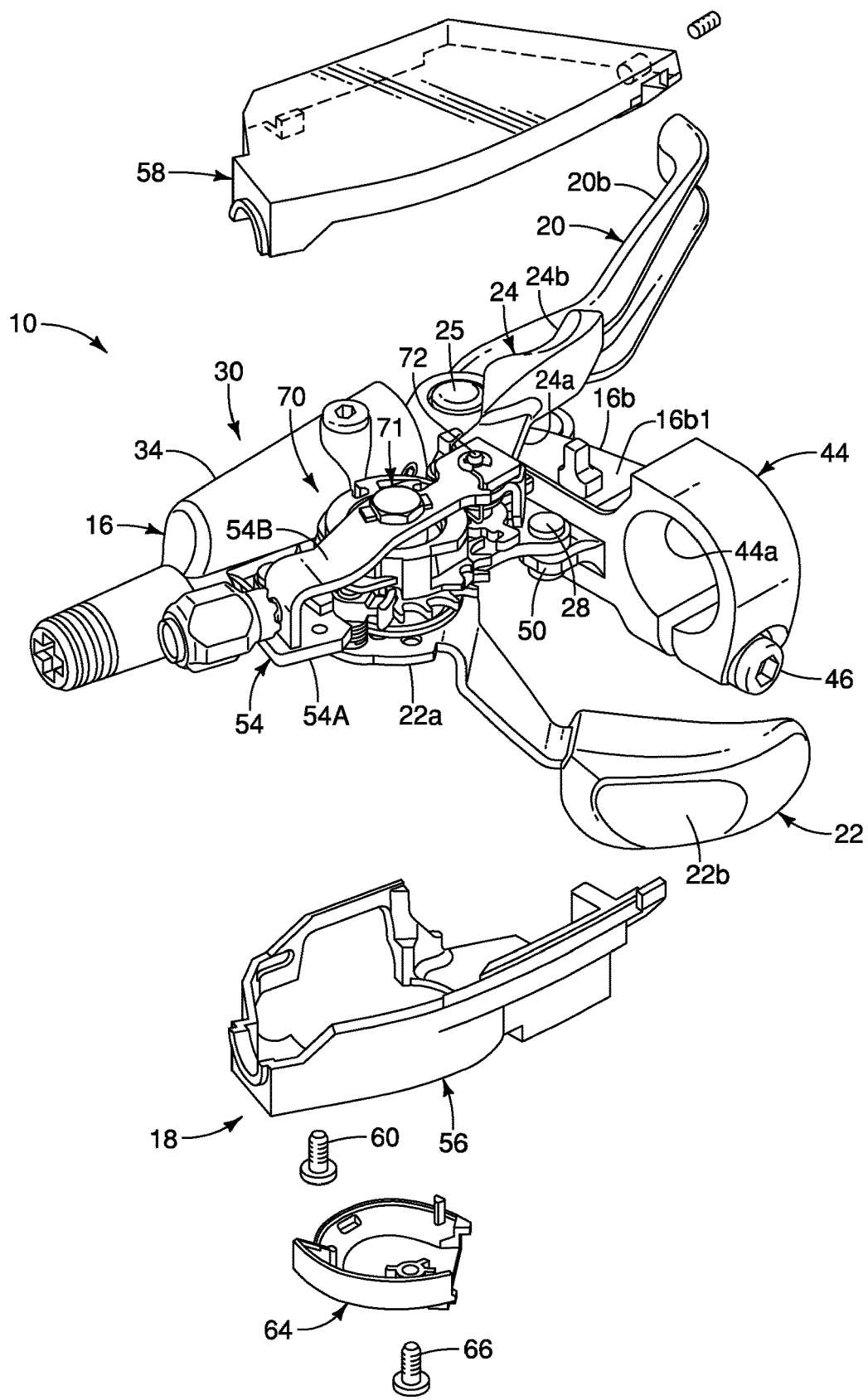
FIG. 11 is a partially exploded perspective view of selected parts of the operating device illustrated in FIGS. 1 to 5.

Basically, as seen in FIGS. 6 to 8, the second base member 18 includes a shift housing 52 and a support member 54. Here, the shift housing 52 includes a first housing part 56 and a second housing part 58. The first housing part 56 and the second housing part 58 are fastened together and to the support member 54 using a combination of screws, hooks, and/or snap-fit connections. For example, here as seen in FIGS. 3 and 11, the first housing part 56 is fastened to the support member 54 by a fastener 60 (e.g., a screw in the illustrated embodiment). As seen in FIGS. 7 and 8, the second housing part 58 is attached to the first housing part 56 by a hook 58a that hooks onto a ledge 56b of the first housing part 56 and a fastener 62 (e.g., a set screw in the illustrated embodiment) that screwed into a threaded hole 58b of the second housing part 58 and engages a portion 56b of the first housing part 56. The first housing part 56 and the second housing part 58 are stationary parts with respect to the support member 54. Here, the shift housing 52 further includes a third housing part 64 that is attached to the first shift operating member 22 by a fastener 66 (e.g., a screw in the illustrated embodiment). Thus, the third housing part 64 is configured to move with respect to the support member 54 as the first shift operating member 22 is operated. The shift housing 52 is spaced apart from the first coupling member 26. The shift housing 52 is a separate member from the first base member 16.

Figure 15:
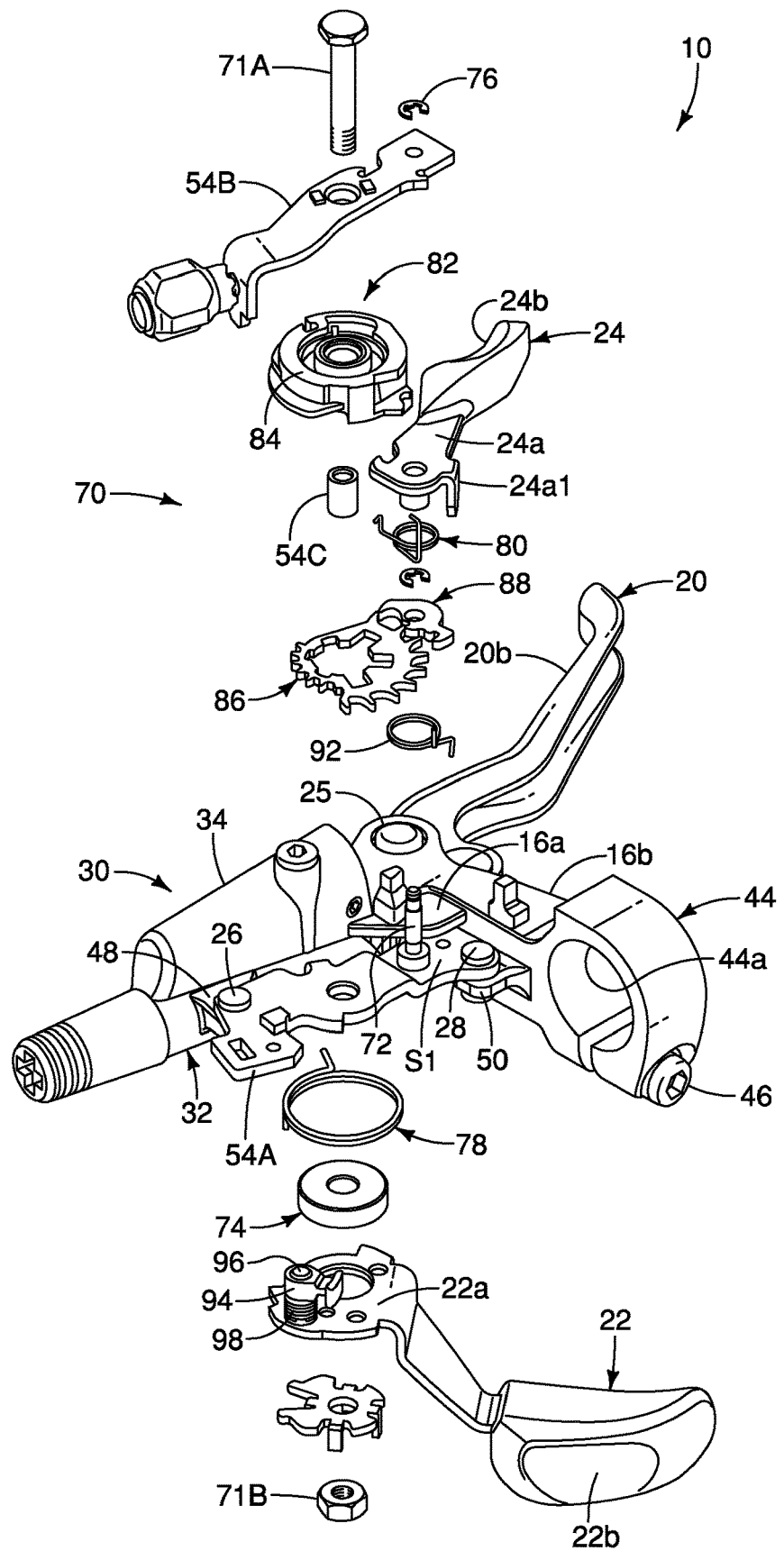
FIG. 15 is an exploded perspective view of the operating device illustrated in FIGS. 12 to 14.

The support member 54 is a separate member from the first base member 16. In particular, the support member 54 is coupled to the first base member 16 by the first coupling member 26. Also, the support member 54 is coupled to the first base member 16 by the second coupling member 28. The support member 54 is at least partly disposed inside the shift housing 52. In particular, the support member 54 is substantially disposed inside the shift housing 52 between the first housing part 56 and the second housing part 58. As seen in FIG. 15, the support member 54 has a first side surface S1 contacting the support portion 16a. In this way, the support member 54 is supported by the first base member 16 to assist in limiting the support member 54 from tilting relative to the first base member 16 as mentioned above.

In the first embodiment, the support member 54 includes a first support plate 54A and a second support plate 54B. The first support plate 54A and the second support plate 54B are rigid plate members that are made of a suitable material such a metallic material. Here, the first support plate 54A and the second support plate 54B are stamped metal plates that are spaced apart by a spacer 54C. The spacer 54C is a tubular member. Here, the first support plate 54A has a first opening 54A1 for receiving the first coupling member 26 therethrough and a second opening 54A2 for receiving the second coupling member 28 therethrough. Here, the first support plate 54A includes the side surface S1 that contacts the support portion 16a.

Figure 12:
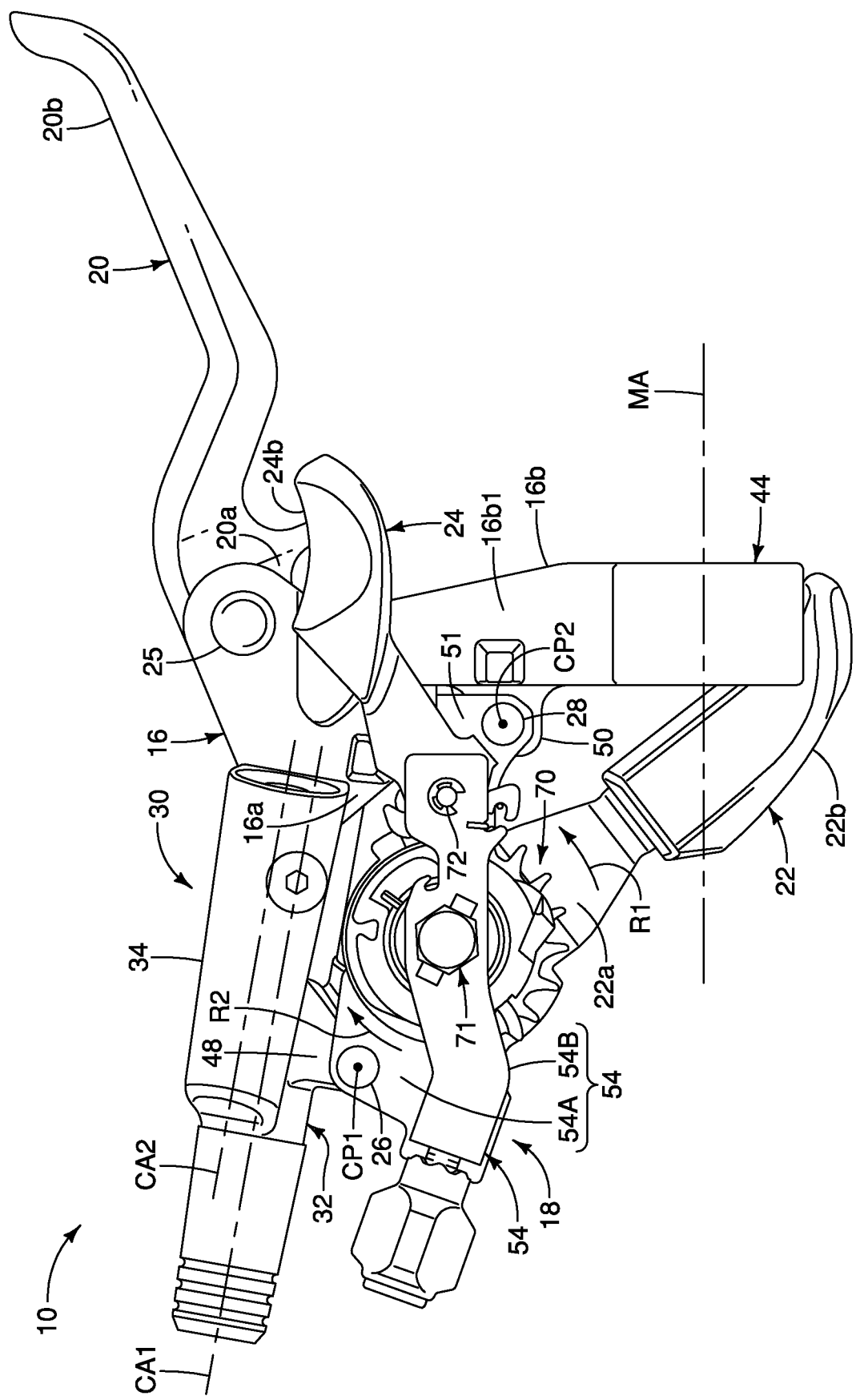
FIG. 12 is a top view of the operating device illustrated in FIGS. 1 to 5, but in which the shift housing has been omitted.

In the first embodiment, as seen in FIGS. 6, 11 and 12, the second base member 18 is provided with a shifting mechanism 70. The shifting mechanism 70 is operated in response to operations of the first shift operating member 22 and the second shift operating member 24. The shifting mechanism 70 is supported on the support member 54 and provided inside the shift housing 52. According, the first base member 16, the first operating member 20 and the hydraulic unit 30 form a first subassembly for operating the first vehicle component BC1, while the second base member 18, the first shift operating member 22, the second shift operating member 24 and the shifting mechanism 70 form a second subassembly for operating the second vehicle component BC2.

Basically, the first shift operating member 22 includes a mounting portion 22a and a user operating portion 22b. The mounting portion 22a is covered by the third housing part 64. The user operating portion 22b extends outwardly from the shift housing 52. In this disclosure, since the overall shape of the first shift operating member 22 is not straight and does not lie in a single plane, the first operating plane OP1 is defined by the mounting portion 22a. Similarly, basically, the second shift operating member 24 includes a mounting portion 24a and a user operating portion 24b. The mounting portion 24a is covered by the first housing part 56 and the second housing part 58. The user operating portion 24b extends outwardly from the shift housing 52. In this disclosure, since the overall shape of the second shift operating member 24 is not straight and does not lie in a single plane, the second operating plane OP2 is defined by the mounting portion 24a.

Referring to FIG. 4, the user operating portion 24b of the second shift operating member 24 has a finger contact surface that is positioned above the user operating portion 20b of the first operating member 20. Preferably, a distance D1 between a center of the finger contact surface of the user operating portion 24b of the second shift operating member 24 and a center of the finger contact surface of the user operating portion 20b of the first operating member 20 is in a range of 13.5 millimeters to 16.0 millimeters to provide an ergonomic arrangement for shifting and braking. A distance above 16 millimeters results in a configuration that is too bulky and not ergonomic. A distance below 13.5 millimeters may result in a user's finger interfering with the operation of one or the other of the first operating member 20 and the second shift operating member 24.

Referring to FIG. 4, the user operating portion 22b of the first shift operating member 22 has a finger contact surface that is positioned below the user operating portion 20b of the first operating member 20. Preferably, a distance D2 between a center of the finger contact surface of the user operating portion 22b of the first shift operating member 22 and a center of the finger contact surface of the user operating portion 20b of the first operating member 20 is about 35.75 millimeters to provide an ergonomic arrangement for shifting and braking. A distance above 35.75 millimeters results in a configuration that is too bulky and not ergonomic. A distance below 35.75 millimeters may result in a user's finger interfering with the operation of one or the other of the first operating member 20 and the first shift operating member 22.

As explained below, the first shift operating member 22 and the second shift operating member 24 are each biased to a rest position and moved by a rider from rest position to an operated position to perform a shifting operation. The term "rest position" as used herein refers to a state in which a movable part (e.g., the first shift operating member 22 or the second shift operating member 24) remains stationary without the need of a user intervening (e.g., holding the movable part) in the state corresponding to the rest position. Thus, the term "rest position" can also be referred to as a non-operated position The first shift operating member 22 is movably coupled to the second base member 18. Likewise, the second shift operating member 24 is movably coupled to the second base member 18. Here, the first shift operating member 22 is movably coupled to the second base member 18 on a first pivot axle 71. Basically, the first shift operating member 22 is pivotally disposed with respect to the second base member 18 about a first shift operating axis A1 between the non-operated position and the operated position. On the other hand, the second shift operating member 24 is movably coupled to the second base member 18 on a second pivot axle 72. Basically, the second shift operating member 24 is pivotally disposed with respect to the second base member 18 about a second shift operating axis A2 between the non-operated position and the operated position.

Figure 16:
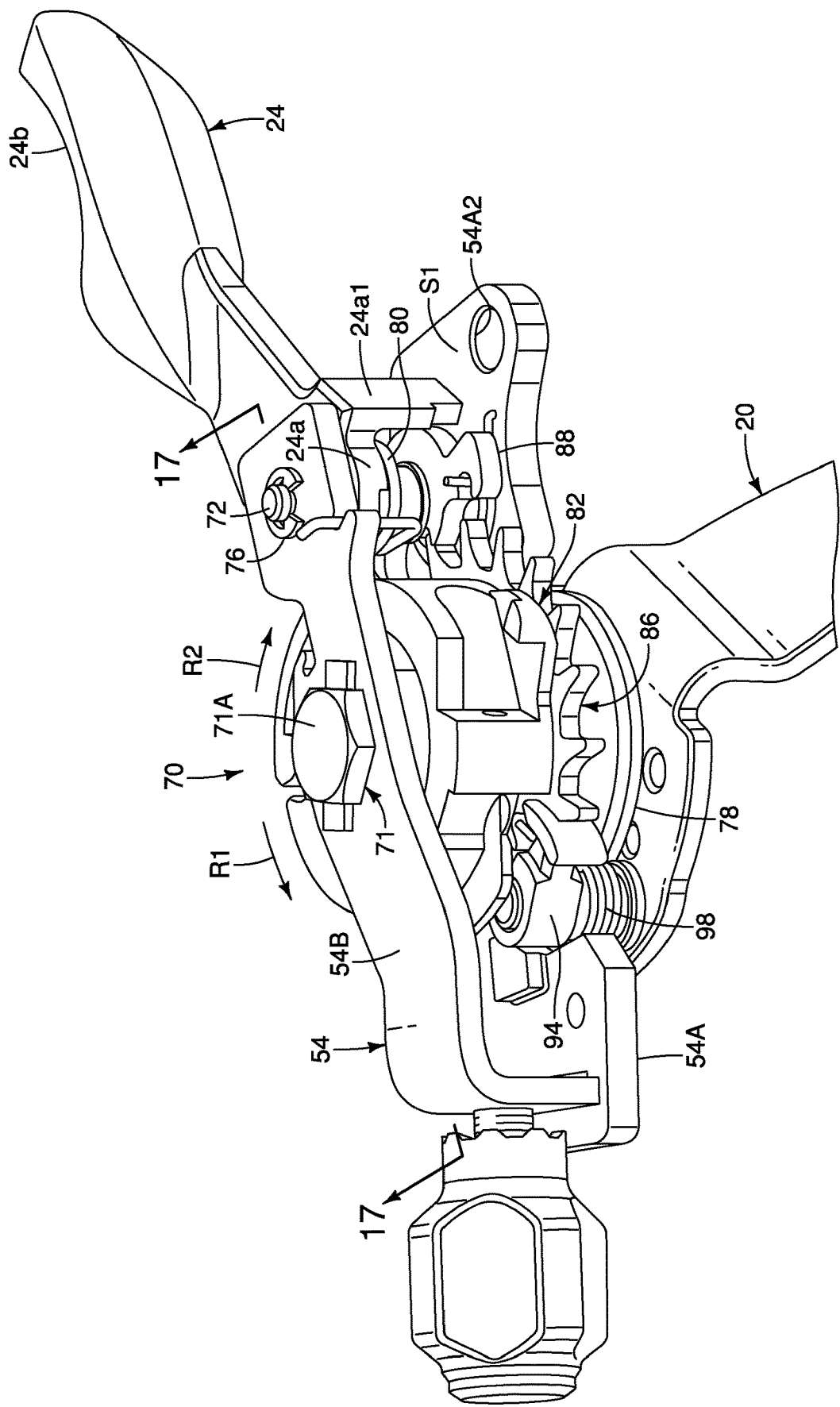
FIG. 16 is an enlarged perspective view of a portion of the shift mechanism of the operating device illustrated in FIGS. 1 to 5.
Figure 17:
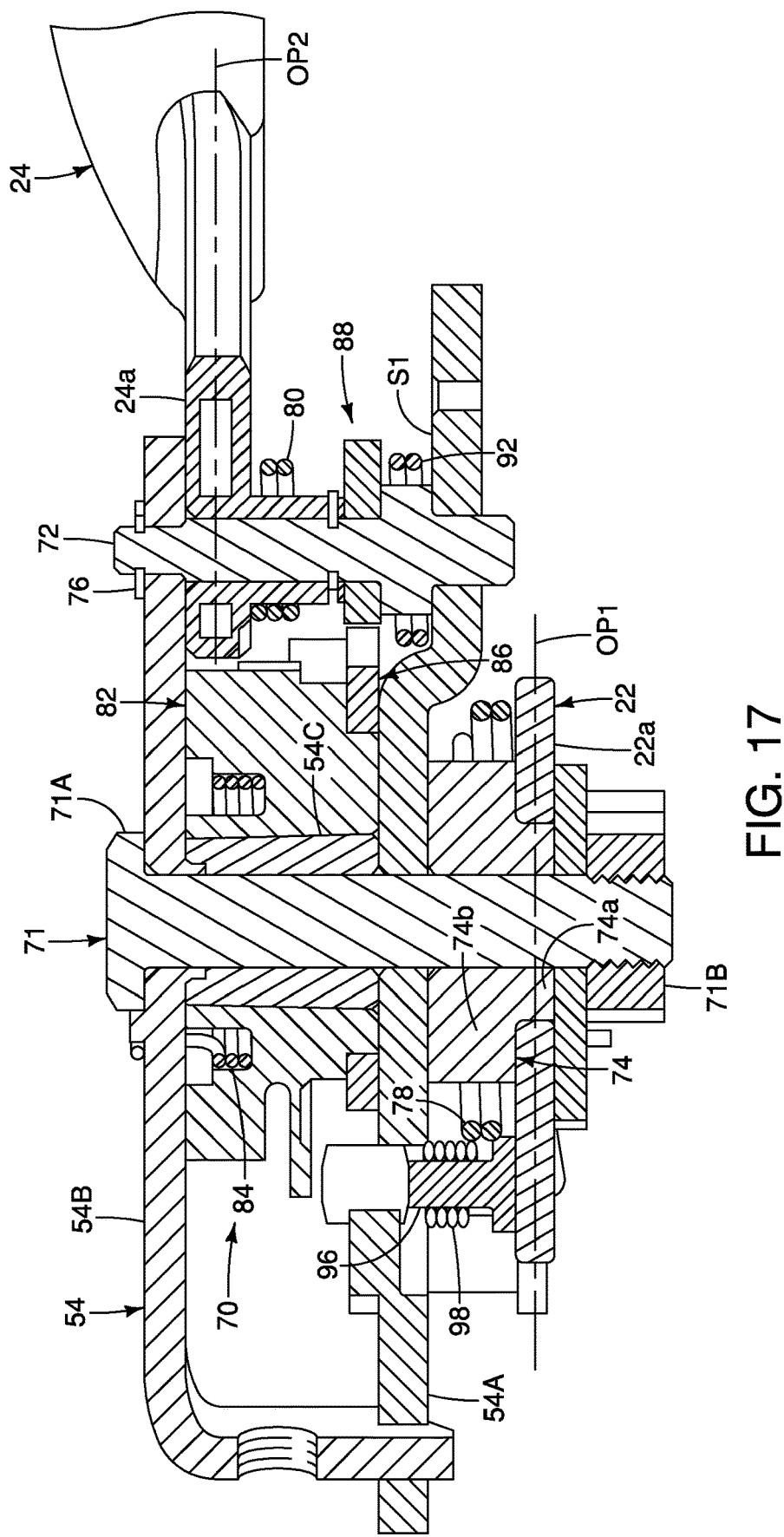
FIG. 17 is a cross sectional view of the shift mechanism illustrated FIG. 16 as seen along section line 17-17 of FIG. 16.
Figure 18:
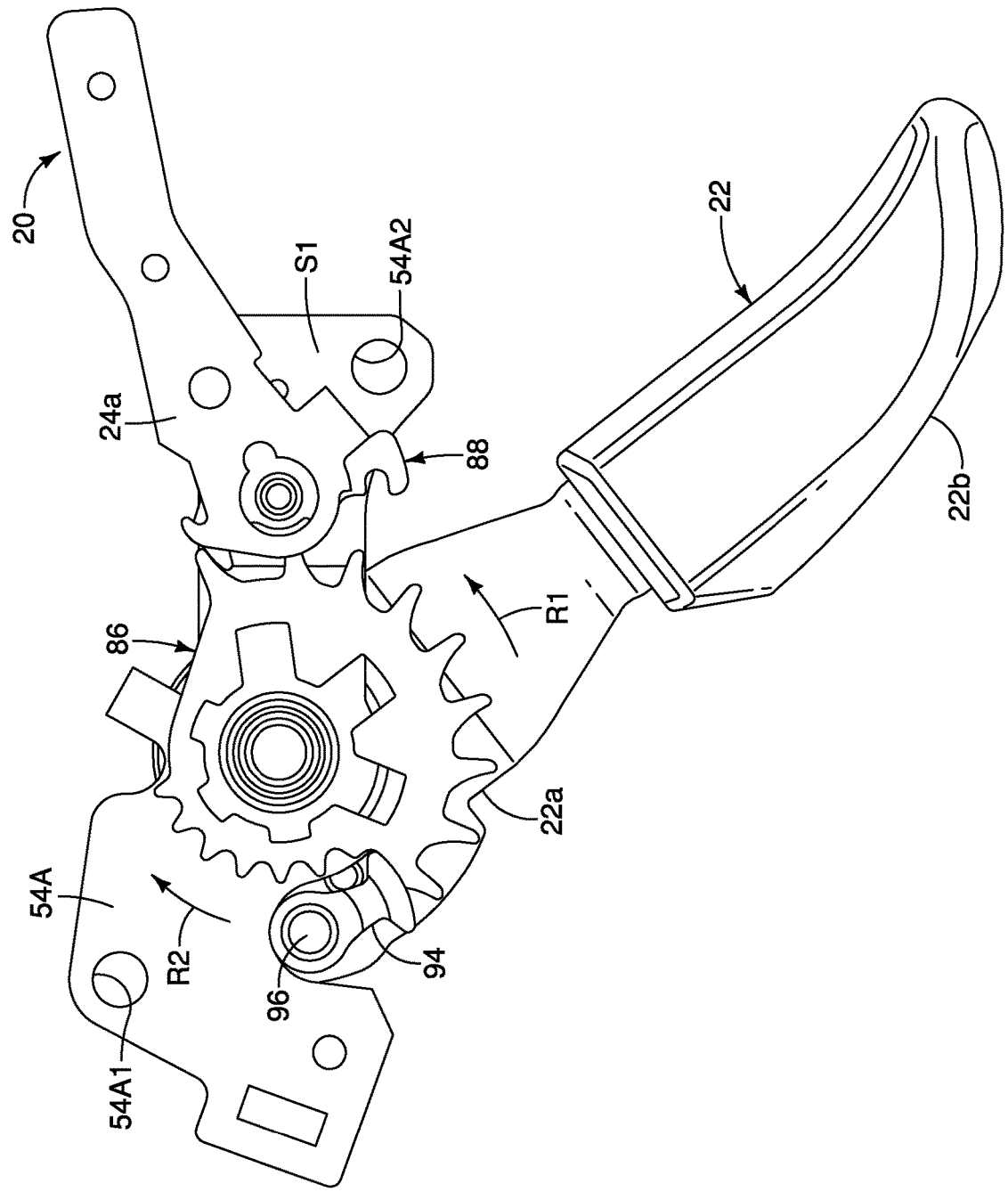
FIG. 18 is a top view of selected parts of the shift mechanism illustrated FIGS. 16 and 17.
Figure 19:
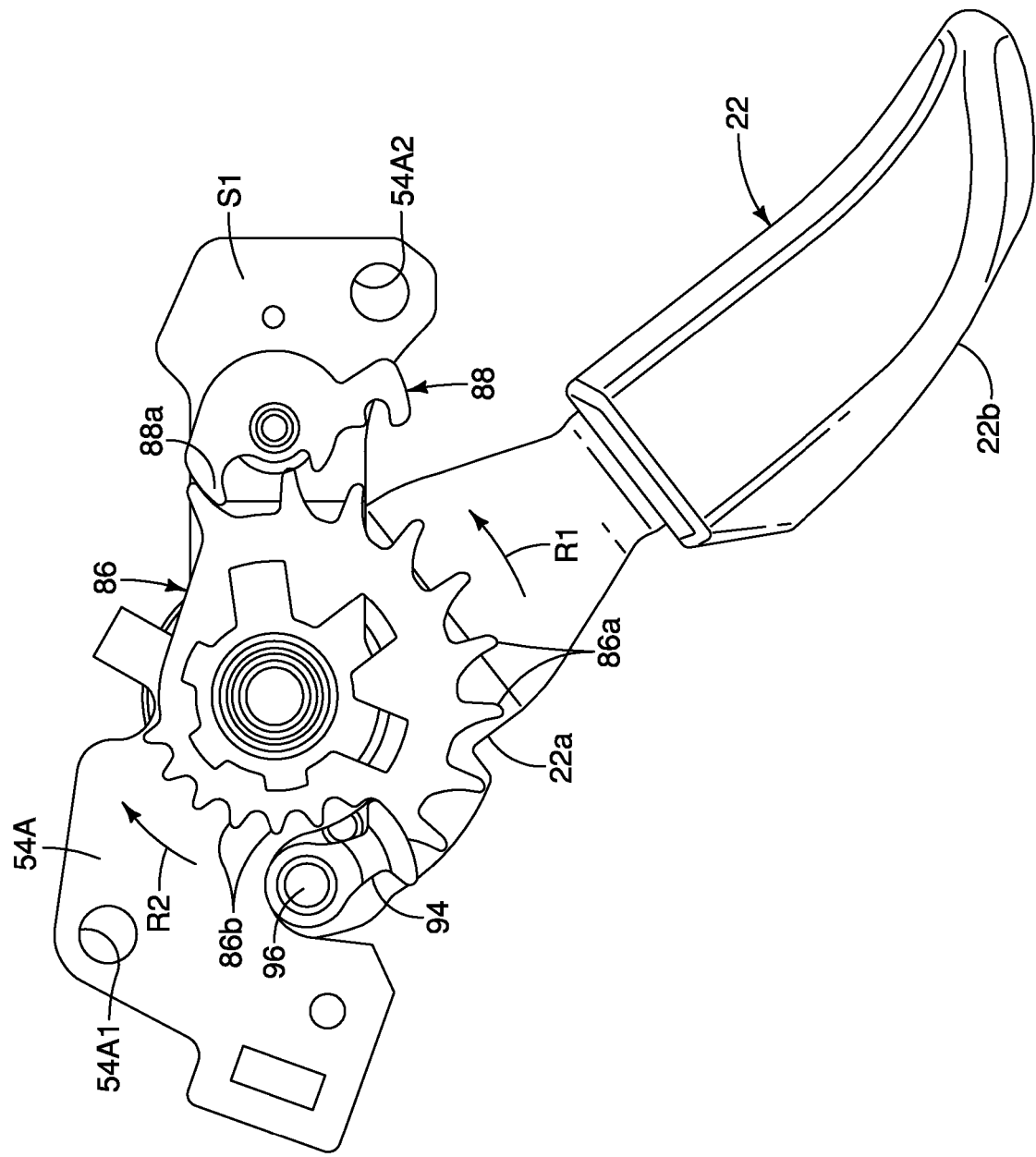
FIG. 19 is a top view of selected parts of the shift mechanism illustrated FIGS. 16 to 18.

In the first embodiment, as seen in FIGS. 15 to 17, the first pivot axle 71 and the second pivot axle 72 are parallel. Also, the first pivot axle 71 and the second pivot axle 72 are free from direct connection to the first base member 16. Here, the first coupling member 26 is offset from the first pivot axle 71 as viewed from an axial direction of the first pivot axle 71. The second coupling member 28 is offset from the second pivot axle 72 as viewed from an axial direction of the second pivot axle 72. Thus, the first coupling member 26 and the second coupling member 28 are offset from the first pivot axle 71 and the second pivot axle 72 as viewed in a direction parallel to the first pivot axle 71 and the second pivot axle 72. With this arrangement of the second base member 18 with respect to the first base member 16, the first pivot axle 71 is disposed between the handlebar mounting axis MA of the mounting bracket 44 and the cylinder axis CA1 of the cylinder housing 32 as viewed along a direction parallel to the first pivot axle 71. The second pivot axle 72 is also disposed between the handlebar mounting axis MA of the mounting bracket 44 and the cylinder axis CA1 of the cylinder housing 32 as viewed along a direction parallel to the second pivot axle 72. With this arrangement, the support member 54 is disposed between the handlebar mounting axis MA of the mounting bracket 44 and the cylinder axis CA1 of the cylinder housing 32 as viewed along a direction parallel to the first pivot axle 71.

Here, as seen in FIG. 17, the first pivot axle 71 is formed by a bolt 71A and a nut 71B. The first pivot axle 71 is configured to couple the first shift operating member 22 to the support member 54. The first pivot axle 71 is also coupled the first support plate 54A and the second support plate 54B together. The shaft of the bolt 71A passes through the spacer 54C. A support bushing 74 is also provided on the shaft of the bolt 71A for pivotally supporting the first shift operating member 22 to the first pivot axle 71. The support bushing 74 is positioned on the first pivot axle 71 between the second base member 18 and the first shift operating member 22. The support bushing 74 is a step-shaped, and has a bushing section 74a and a support section 74b. The bushing section 74a and the support section 74b are formed as a one-piece member. The bushing section 74a has a smaller diameter than the support section 74b. The first shift operating member 22 is pivotally disposed on the bushing section 74a. The support section 74b is disposed between the first support plate 54A and the mounting portion 22a of the first shift operating member 22. In particular, the support section 74b contacts the second base member 18 and the first shift operating member 22. The first shift operating member 22 is pivotally supported around the bushing section 74a. Thus, the support section 74b functions as a spacer for spacing the mounting portion 22a of the first shift operating member 22 axially from the first support plate 54A with respect to the first shift operating axis A1.

The second pivot axle 72 is retained between the first support plate 54A and the second support plate 54B. The second pivot axle 72 is configured to help maintain the spacing between the first support plate 54A and the second support plate 54B with respect to the second shift operating axis A2. A retaining clip 76 is provided to the second pivot axle 72 to retain the second support plate 54B to the second pivot axle 72.

As seen in FIGS. 15 to 17, the operating device 10 further comprises a biasing member 78. The biasing member 78 is operatively coupled between the first shift operating member 22 and the support member 54 for biasing the first shift operating member 22 towards the non-operated or rest position of the first shift operating member 22. The biasing member 78 is, for example, a torsion spring having a coiled portion coiled around the bushing section 74b of the support bushing 74. A first end of the biasing member 78 is engaged with the support member 54, while a second end of the biasing member 78 is engaged with the first shift operating member 22. In this way, the first shift operating member 22 is a trigger lever that returns to the non-operated position after being pivoted from the non-operated position to an operated position and then released. Thus, the biasing member 78 constitutes a first return spring for returning the first shift operating member 22 to the rest position. The cylinder housing 32 includes a first abutment 32d extending outwardly from the cylinder wall 32a. The first operating member 20 is biased against the first abutment 32d to establish the rest or neutral position of the first operating member 20 with respect to the second base member 18.

As seen in FIGS. 15 to 17, the operating device 10 further comprises a biasing member 80. The biasing member 80 is operatively coupled between the second shift operating member 24 and the support member 54 for biasing the second shift operating member 24 towards the non-operated or rest position of the second shift operating member 24. The biasing member 78 is, for example, a torsion spring having a coiled portion coiled around the second pivot axle 72. A first end of the biasing member 80 is engaged with the support member 54, while a second end of the biasing member 80 is engaged with the second shift operating member 24. In this way, the second shift operating member 24 is a trigger lever that returns to the non-operated position after being pivoted from the non-operated position to an operated position and then released. Thus, the biasing member 80 constitutes a second return spring for returning the second shift operating member 24 to the rest position.

As seen in FIGS. 15 to 17, the operating device 10 further comprises a wire takeup member 82 pivotally mounted on the second base member 18. The wire takeup member 82 is part of the shifting mechanism 70. The wire takeup member 82 is pivotally supported on the spacer 54C. The wire takeup member 82 is moved in a first direction R1 in response to a first user operation of the first shift operating member 22. The wire takeup member 82 is moved in a second direction R2 in response to a second user operation of the second shift operating member 24. The first direction R1 is different from the second direction R2. Thus, basically, the first shift operating member 22 is used for pivoting the wire takeup member 82 to pull the inner wire 14A into the shift housing 52. On the other hand, the second shift operating member 24 is used for pivoting the wire takeup member 82 to release the inner wire 14A to pay out from the shift housing 52.

As seen in FIGS. 15 to 17, the operating device 10 further comprises a biasing member 84 for biasing the wire takeup member 82 in the second direction R2, which corresponds to a wire releasing direction. In particular, the biasing member 84 is operatively coupled between the wire takeup member 82 and the second support plate 54B of the support member 54 for biasing the wire takeup member 82 in the second direction R2. Here, the biasing member 78 is, for example, a torsion spring having a coiled portion coiled around the first pivot axle 71.

As seen in FIGS. 15 to 20, the operating device 10 further comprises a positioning ratchet 86 and a positioning pawl 88. The positioning ratchet 86 and the positioning pawl 88 are parts of the shifting mechanism 70. The positioning ratchet 86 is configured to move with the wire takeup member 82. The positioning ratchet 86 includes a plurality of first teeth 86a, and plurality of second teeth 86b. The positioning pawl 88 is pivotally mounted on the second pivot axle 72. The positioning pawl 88 includes a positioning tooth 88a. The positioning tooth 88a of the positioning pawl 88 is configured to engage the first teeth 86a of the positioning ratchet 86 to selectively establish a plurality of predetermined positions of the wire takeup member 82.

Figure 20:
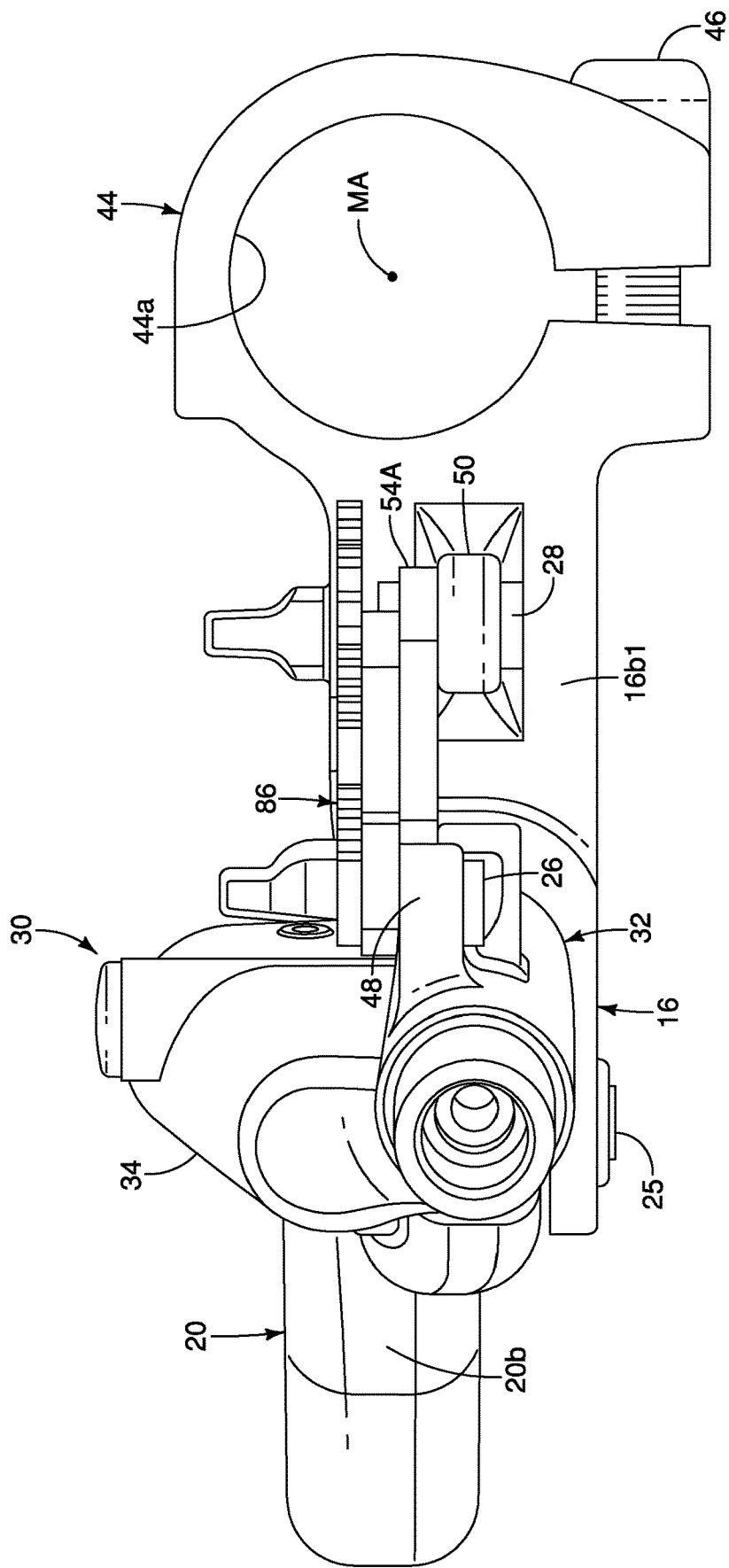
FIG. 20 is a side elevational view of selected parts of the operating device illustrated FIGS. 1 to 5.

As seen in FIG. 20, the positioning ratchet 86 is positioned above the handlebar mounting axis MA. Here, where the first support plate 54A and the second support plate 54B are stamped metal plates for supporting the shifting mechanism 70 instead of a metal casted platform, preferably, the distance between the bottom of the positioning ratchet 86 and the handlebar mounting axis MA is preferable less than 3.8 millimeters and more preferably equal to or less than 2.3 millimeters. This arrangement provides for a compact design. Also as seen in FIG. 20, the positioning ratchet 86 is positioned above the center axis C of the cylinder housing 32. Also, the where the first support plate 54A and the second support plate 54B are stamped metal plates for supporting the shifting mechanism 70 instead of a metal casted platform, preferably, the distance between the bottom of the positioning ratchet 86 and cylinder housing 32 is preferable less than 9.5 millimeters and more preferably equal to or less than 8.0 millimeters. Again, this arrangement provides for a compact design.

Here, as seen in FIGS. 15 to 17, the operating device 10 further comprises a biasing member 92 for biasing the positioning pawl 88 towards engagement with the positioning ratchet 86. In particular, the biasing member 92 is operatively coupled between the positioning pawl 88 and the first support plate 54A of the support member 54 for biasing the positioning tooth 88a of the positioning pawl 88 towards engagement with one of the first teeth 86a of the positioning ratchet 86. Here, the biasing member 92 is, for example, a torsion spring having a coiled portion coiled around the second pivot axle 72.

The operating device 10 further comprises a pulling pawl 94. The pulling pawl 94 can also be referred to a driving pawl. The pulling pawl 94 is configured to pivot the wire takeup member 82 and the positioning ratchet 86 in response to movement of the first shift operating member 22 during a pulling operation. Here, the pulling pawl 94 is movably mounted relative to the first shift operating member 22. The pulling pawl 94 is arranged to engage one of the second teeth 86b of the positioning ratchet 86 as the first shift operating member 22 moves from a rest position towards an operated position. More specifically, the pulling pawl 94 is pivotally disposed on a pivot post 96 that is fixed to the first shift operating member 22 In this way, the pulling pawl 94 is moved with the movement of the first shift operating member 22 and pivots on the first shift operating member 22 to rotate the wire takeup member 82 and the positioning ratchet 86 in the first direction R1, which corresponds to a wire pulling direction.

Here, the operating device 10 further comprises a biasing member 98 for biasing the pulling pawl 94 towards engagement with one of the second teeth 86b of the positioning ratchet 86. In particular, the biasing member 98 is operatively coupled between the pulling pawl 94 and the first shift operating member 22 for biasing the pulling pawl 94 towards engagement with one of the second teeth 86b of the positioning ratchet 86. Here, the biasing member 98 is, for example, a torsion spring having a coiled portion coiled around the pivot post 96. When the first shift operating member 22 is in the rest position, the pulling pawl 94 contacts an edge of the first support plate 54A of the support member 54 for holding the pulling pawl 94 out of engagement with the second teeth 86b of the positioning ratchet 86. As the first shift operating member 22 is pivoted in the first direction R1, the pulling pawl 94 rides off the edge of the first support plate 54A of the support member 54 and engages one of the second teeth 86b of the positioning ratchet 86 to rotate the wire takeup member 82 and the positioning ratchet 86 in the first direction R1. As the wire takeup member 82 and the positioning ratchet 86 rotate in the first direction R1, the first teeth 86a will rotate the positioning pawl 88 so that the positioning tooth 88a of the positioning pawl 88 moves out of engagement with one of the first teeth 86a and then engage the next one of the first teeth 86a.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the operating device. Accordingly, these directional terms, as utilized to describe the operating device should be interpreted relative to a human-powered vehicle (e.g., bicycle) in an upright riding position on a horizontal surface and that is equipped with the operating device. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operating device for a human-powered vehicle, the operating device comprising:
   a first base member including a cylinder housing and a first extending portion integrally formed with the cylinder housing, the cylinder housing including a cylinder wall defining a cylinder bore;
   a first operating member movably coupled to the first base member; and
   a second base member coupled to the first base member by a first coupling member;
   a first shift operating member movably coupled to the second base member on a first pivot axle; and
   a piston operatively coupled to the first operating member and movably disposed in a cylinder bore of the cylinder housing,
   the first coupling member coupling the second base member to the cylinder housing
   the first base member, the second base member, and the first coupling member being separate members from one another.

2. The operating device according to claim 1, wherein the first base member includes a reservoir fluidly connected to the cylinder bore by a connecting opening.

3. The operating device according to claim 2, wherein the first operating member is movable relative to the first base member along an operating plane,
   the first shift operating member is disposed on one side of the operating plane, and
   the reservoir is disposed on an opposite side of the operating plane from the first shift operating member.

4. The operating device according to claim 2, further comprising:
   a second shift operating member movably coupled to the second base member on a second pivot axle,
   the second shift operating member being movable relative to the first base member along a second operating plane, and
   the reservoir being at least partly disposed on the second operating plane.

5. The operating device according to claim 1, further comprising:
   a second shift operating member movably coupled to the second base member on a second pivot axle,
   the first base member further including an integrated portion integrally formed with the cylinder housing,
   the second base member being coupled to the integrated portion by a second coupling member, and
   the second coupling member being offset from the second pivot axle as viewed from an axial direction of the second pivot axle.

6. The operating device according to claim 5, wherein the first pivot axle and the second pivot axle are parallel, and
   the first coupling member and the second coupling member are offset from the first pivot axle and the second pivot axle as viewed in a direction parallel to the first pivot axle and the second pivot axle.

7. The operating device according to claim 5, wherein the first pivot axle and the second pivot axle are free from direct connection to the first base member.

8. The operating device according to claim 5, wherein the first operating member is movable relative to the first base member along an operating plane,
   the first shift operating member is disposed on one side of the operating plane, and
   the second shift operating member is disposed on an opposite side of the operating plane from the first shift operating member.

9. The operating device according to claim 1, wherein the first base member further includes an integrated portion integrally formed with the cylinder housing,
   the second base member is coupled to the integrated portion by a second coupling member,
   the first base member includes a second extending portion extending outwardly from the integrated portion,
   the second coupling member couples the second base member to the second extending portion,
   the first extending portion extends from the cylinder wall in a first direction into an area between the cylinder wall and an intermediate portion of the integrated portion,
   the second extending portion of the first base member extends from the integrated portion in a second direction into the area, and
   the second direction is different from the first direction.

10. The operating device according to claim 1, wherein the first base member further includes an integrated portion integrally formed with the cylinder housing, and
    the second base member is coupled to the integrated portion by a second coupling member.

11. The operating device according to claim 10, wherein the first base member includes a second extending portion extending outwardly from the integrated portion,
    the second coupling member couples the second base member to the second extending portion.

12. The operating device according to claim 10, wherein the integrated portion includes an intermediate portion connecting the cylinder housing to a mounting bracket,
    the mounting bracket is configured to be mounted to a handlebar of the human-powered vehicle, and
    the second coupling member couples the second base member to the intermediate portion.

13. The operating device according to claim 10, wherein the second coupling member includes one of a second rivet and a second bolt.

14. The operating device according to claim 1, wherein the first coupling member includes one of a first rivet and a first bolt.

15. The operating device according to claim 1, wherein the first coupling member is offset from the first pivot axle as viewed from an axial direction of the first pivot axle.

16. The operating device according to claim 1, wherein the second base member includes a shift housing and a support member,
    the support member is at least partly disposed inside the shift housing,
    the shift housing is spaced apart from the first coupling member, and
    the shift housing is a separate member from the first base member.

17. The operating device according to claim 16, wherein the first base member includes a support portion, and the support member has a first side surface contacting the support portion.

18. The operating device according to claim 1, wherein the second base member includes a shift housing and a support member,
the support member is a separate member from the first base member, and
the support member is disposed between a handlebar mounting axis of a mounting bracket and a cylinder axis of the cylinder housing as viewed along a direction parallel to the first pivot axle.

19. The operating device according to claim 1, wherein the first pivot axle is disposed between a handlebar mounting axis of a mounting bracket and a cylinder axis of the cylinder housing as viewed along a direction parallel to the first pivot axle.

20. The operating device according to claim 1, further comprising
a wire takeup member pivotally mounted on the second base member.

21. An operating device for a human-powered vehicle, the operating device comprising:
a first base member including a cylinder housing and a reservoir fluidly connected to a cylinder bore of the cylinder housing;
a first operating member movably coupled to the first base member;
a second base member coupled to the first base member;
a first shift operating member movably coupled to the second base member on a first pivot axle; and
a second shift operating member movably coupled to the second base member on a second pivot axle,
the first operating member being movable relative to the first base member along first operating plane,
the first shift operating member being disposed on one side of the first operating plane,
the reservoir being disposed on an opposite side of the first operating plane from the first shift operating member,
the second shift operating member being movable relative to the first base member along a second operating plane, and
the reservoir being at least partly disposed on the second operating plane.

22. An operating device for a human-powered vehicle, the operating device comprising:
a first base member including a cylinder housing and an integrated portion integrally formed with the cylinder housing;
a first operating member movably coupled to the first base member;
a second base member coupled to the first base member by a first coupling member and a second coupling member; and
a first shift operating member movably coupled to the second base member on a first pivot axle,
the first coupling member coupling the second base member to one of the cylinder housing and the integrated portion at a first coupling point,
the second coupling member coupling the second base member to one of the cylinder housing and the integrated portion at a second coupling point,
the second coupling point being different from the first coupling point,
the first base member, the second base member, and the first coupling member being separate members from one another.

23. The operating device according to claim 22, wherein the first coupling member couples the second base member to the cylinder housing.

24. The operating device according to claim 22, wherein the second coupling member couples the second base member to the integrated portion.

25. An operating device for a human-powered vehicle, the operating device comprising:
a first base member;
a first operating member movably coupled to the first base member;
a second base member including a shift housing and a support member, the shift housing being fastened to the support member by a fastener; and
a first shift operating member movably coupled to the second base member on a first pivot axle,
the support member being coupled to the first base member by a first coupling member,
the support member being at least partly disposed inside the shift housing,
the shift housing being spaced apart from the first coupling member,
the shift housing being a separate member from the first base member.

26. An operating device for a human-powered vehicle, the operating device comprising:
a first base member including a cylinder housing;
a first operating member movably coupled to the first base member;
a second base member including a shift housing and a support member; and
a first shift operating member movably coupled to the second base member on a first pivot axle,
the support member being a separate member from the first base member,
the support member being disposed between a handlebar mounting axis of a mounting bracket and a cylinder axis of the cylinder housing as viewed along a direction parallel to the first pivot axle,
the support member including a first support plate and a second support plate, the first support plate being separate from the first base member, the second support plate being separate from the first base member, and the first support plate and the second support plate being separate members from each other.

* * * * *